United States Patent
Kou et al.

(10) Patent No.: US 7,743,519 B2
(45) Date of Patent: Jun. 29, 2010

(54) SENSOR MODULE, METHOD OF CORRECTION THEREFOR, AND MOBILE OBJECT INCLUDING THE SENSOR MODULE

(75) Inventors: Futoyoshi Kou, Natori (JP); Akihiro Fuse, Natori (JP)

(73) Assignee: Ricoh Company, Ltd., Tokyo (JP)

( * ) Notice: Subject to any disclaimer, the term of this patent is extended or adjusted under 35 U.S.C. 154(b) by 300 days.

(21) Appl. No.: 11/868,141

(22) Filed: Oct. 5, 2007

(65) Prior Publication Data

US 2008/0250661 A1 Oct. 16, 2008

(30) Foreign Application Priority Data

Oct. 6, 2006 (JP) ............... 2006-274614

(51) Int. Cl.
*G01C 17/38* (2006.01)

(52) U.S. Cl. .......................... 33/356; 702/92

(58) Field of Classification Search ............. 33/356; 701/221, 224; 702/92, 93, 94, 95
See application file for complete search history.

(56) References Cited

U.S. PATENT DOCUMENTS

| | | | |
|---|---|---|---|
| 4,966,821 A | | 10/1990 | Kawashima et al. |
| 5,251,139 A | * | 10/1993 | Takano et al. .......... 701/221 |
| 5,404,307 A | * | 4/1995 | Odagawa ............... 701/221 |
| 5,440,303 A | | 8/1995 | Kinoshita |
| 5,828,987 A | * | 10/1998 | Tano et al. ............. 702/150 |
| 6,483,304 B1 | | 11/2002 | Kou et al. |
| 6,600,314 B2 | | 7/2003 | Kou |
| 6,662,459 B2 | | 12/2003 | Kato |
| 6,842,991 B2 | * | 1/2005 | Levi et al. ............. 33/356 |
| 7,337,549 B2 | * | 3/2008 | Cho et al. ............. 33/356 |
| 7,370,530 B2 | * | 5/2008 | DCamp et al. .......... 73/493 |
| 7,376,527 B2 | * | 5/2008 | Hikida et al. .......... 702/92 |
| 7,526,402 B2 | * | 4/2009 | Tanenhaus et al. ....... 702/151 |
| 2006/0066303 A1 | * | 3/2006 | Oohashi et al. ......... 324/249 |
| 2007/0205766 A1 | | 9/2007 | Kou |

FOREIGN PATENT DOCUMENTS

| | | | |
|---|---|---|---|
| JP | 62-030364 | | 2/1987 |
| JP | 02266218 A | * | 10/1990 |
| JP | 03-003190 | | 1/1991 |
| JP | 05071964 A | * | 3/1993 |
| JP | 05-107065 | | 4/1993 |
| JP | 06-174472 | | 6/1994 |
| JP | 07-151842 | | 6/1995 |
| JP | 08240436 A | * | 9/1996 |
| JP | 2000-131068 | | 5/2000 |
| JP | 2003-167039 | | 6/2003 |
| JP | 2005-195376 | | 7/2005 |
| JP | 2006-047299 | | 2/2006 |

* cited by examiner

*Primary Examiner*—R. A. Smith
(74) *Attorney, Agent, or Firm*—Oblon, Spivak, McClelland, Maier & Neustadt, L.L.P.

(57) ABSTRACT

A sensor module maintaining high detection accuracy. Correction data of a detected magnetic field is updated only in a case that a fluctuation band acquired from an output signal of an acceleration sensor is less than a threshold value and a difference between an azimuth angle acquired from an output signal of a terrestrial magnetism sensor and an inclination angle acquired from an output signal of acceleration sensor is less than the threshold value. Therefore, the correction data is updated only in a case that a magnetic field at a position of a mobile object is stably detected, and an accuracy of the correction data can be maintained.

20 Claims, 24 Drawing Sheets

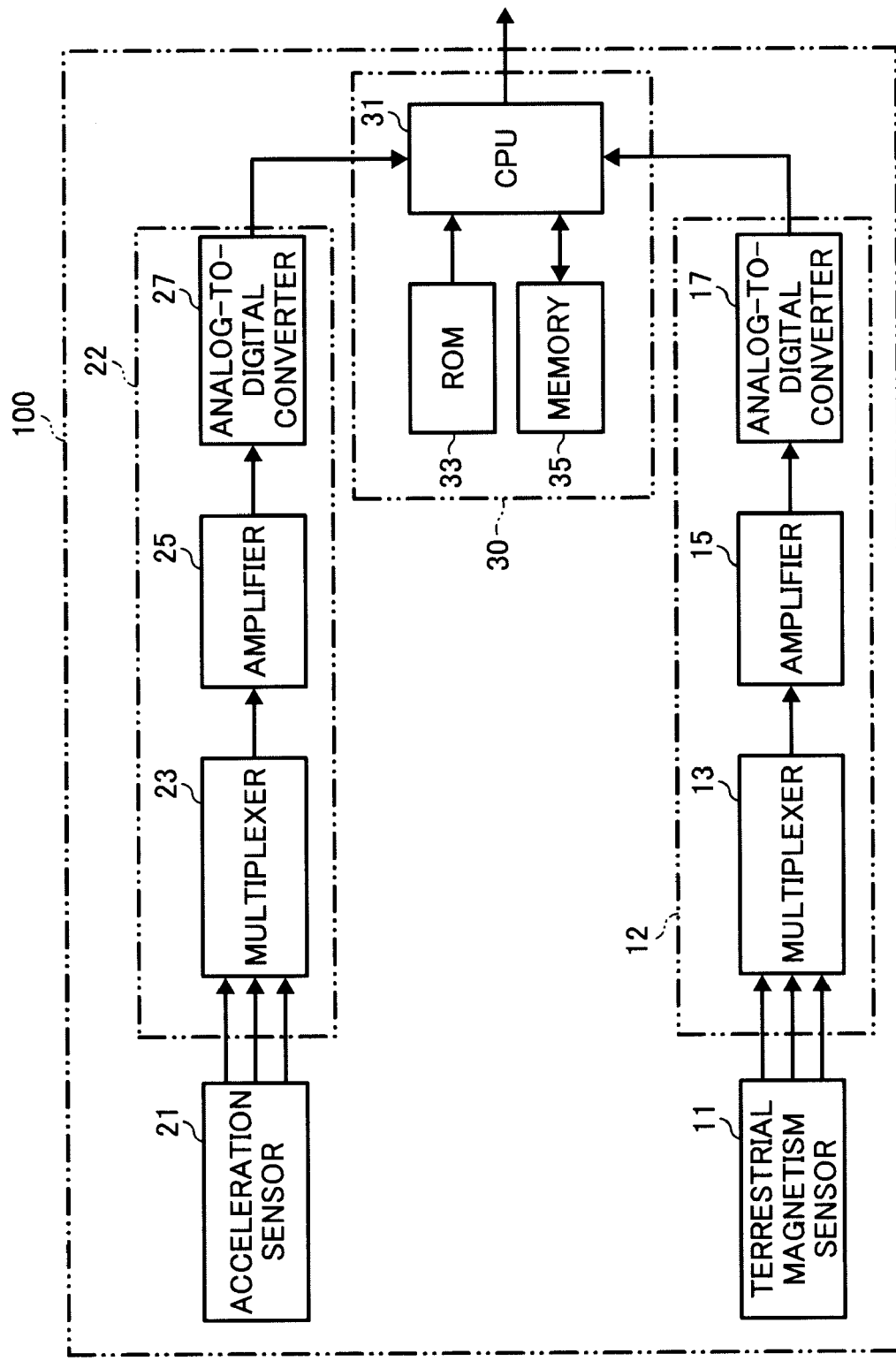

FIG. 17
| n | ACCELERATION DATA | INCLINATION DATA | MAGNETIC DATA |
|---|---|---|---|
| 1 | Dg1 | k1 | Dj1 |
| 2 | Dg2 | k2 | Dj2 |
| 3 | Dg3 | k2 | Dj3 |
| 4 | Dg4 | k2 | Dj4 |
| 5 | Dg5 | k2 | Dj5 |
| ⋮ | ⋮ | ⋮ | ⋮ |
| N | DgN | k3 | DjN |
FIG. 18A
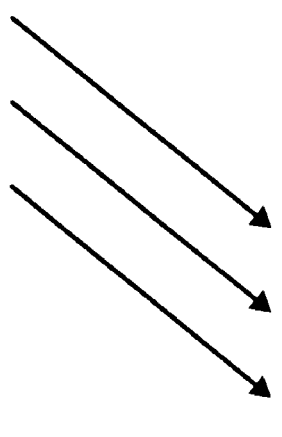
FIG. 18B
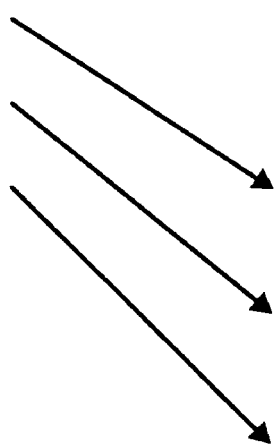

SENSOR MODULE, METHOD OF CORRECTION THEREFOR, AND MOBILE OBJECT INCLUDING THE SENSOR MODULE

BACKGROUND OF THE INVENTION

1. Field of the Invention

The present invention relates to sensor module, a correction method executed in the sensor module, and a mobile object including the sensor module.

2. Discussion of the Background

Recently, it has become common for mobile objects such as a car, a cellular phone, etc. to include an azimuth measurement device that detects terrestrial magnetism and that searches for a moving direction of the mobile object for a navigation system.

An azimuth measurement device may not always provide accurate information and may indicate a wrong direction since output signals of a magnetic sensor generally include offsets caused by extraneous magnetic fields other than terrestrial magnetism. Therefore, it is beneficial to detect such an offset so that the azimuth can be accurately determined.

Japanese Patent No. 1422942 discloses an output signal correction device for an azimuth measurement device that determines a traveling direction of a vehicle or so on. Japanese Patent No. 1660613 discloses a magnetic vector detecting method for eliminating an influence caused by a measurement device or a device mounted on a measurement device being magnetized, and that reference addresses a measurement device having an offset error. Japanese Laid-Open Patent Application No. 2000-131068 discloses an electric azimuth measurement device that can adjust a correction value that reduces an influence of an azimuth measurement device being magnetized (by other than just terrestrial magnetism), to match a maximum value or minimum value of each element of terrestrial magnetism.

Japanese Laid-Open Patent Application No. 2002-48551 discloses an adjusting method for an electric azimuth measurement device using a magnetism generating device. Japanese Laid-Open Patent Application No. H6-174472 discloses an azimuth measurement device that can demagnetize a magnetic sensor part by adding a magnetic field to the magnetic sensor part using a coil. Japanese Laid-Open Patent Application No. H6-249663 discloses an azimuth measurement device that can provide a warning in a case of judging that a signal input from a terrestrial magnetism sensor to a calculating part is outside of a predetermined range, and when the signal is outside of the predetermined range for a time exceeding a predetermined time. That azimuth measurement device can also change the predetermined time according to a quantity for a gap between the signal and an upper limit of the predetermined range or a lower limit.

Japanese Laid-Open Patent Application No. 2005-195376 discloses an azimuth angle measurement method that sets a coordinate point as a criterion point, which is at a position that minimizes a fluctuation of distance between the coordinate point and output data from a terrestrial magnetism part. That azimuth measurement device cancels the criterion point in the case the diameter of a circle, whose center is the criterion point and whose circumference is formed by the data, is outside of a predetermined range.

Japanese Laid-Open Patent Application No. 2006-47299 discloses a correction method that estimates offset measurement values from measurement data of a terrestrial magnetism sensor, calculates each distance between measurement data and the estimated offset measurement value on a coordinate, calculates an average of each distance, calculates root-mean-square deviation based on the each distance and the average, and judges the effectiveness of an offset measurement value based on the root-mean-square.

Japanese Patent No. 2538738 discloses an azimuth measurement device for a vehicle comparing an output value from a terrestrial magnetism sensor one after another and a magnetization intensity at that time (a diameter of a circle formed by output data), and that corrects a center point of the circle on a coordinate accordingly for minimizing an error based on the compared result. That method postulates that the circle formed by the output data is essentially a perfect circle.

Japanese Laid-Open Patent Application No. H7-151842 discloses a magnetism detection device that corrects an induced magnetic field caused by ferromagnetism utilizing a magnetic field by a permanent magnet mounted on an electric device. Japanese Laid-Open Patent Application No. 2003-167039 discloses a magnetic sensor and an azimuth measurement device with the magnetic sensor using a thin-film magnetic resistance effect element. Japanese Laid-Open Patent Application No. 2003-8101 discloses a tunneling magnetic resistance effect element and an azimuth measurement device with the element.

SUMMARY OF INVENTION

The present inventors recognized that the above-noted background art may suffer from defects in not always being able to maintain a high detecting accuracy.

Thereby, an object of the present invention is to provide a novel sensor module, a novel method of correction utilized in a sensor module, and a novel mobile element including the sensor module, that can all enhance maintaining high detection accuracy.

Such a sensor module, method of correction, and mobile object are applicable to a device that stores correction data to correct a magnetic information used by the magnetic sensor.

To achieve the above and other objects, the present invention sets forth a novel sensor module, method of correction in the sensor module, and mobile object including the sensor module, in which a magnetic sensor includes at least two magnetic field detecting axes and that outputs first azimuth data indicating a first direction a reference portion in the mobile object faces based on magnetic information. A motion sensor detects at least one of an acceleration or angular motion of the mobile object and outputs second azimuth data indicating a second direction the reference portion in the mobile object faces based on the acceleration or angular motion. A processing device updates that correction data in a case that the difference between the first azimuth data and the second azimuth data is less than a first predetermined value.

BRIEF DESCRIPTION OF THE DRAWINGS

A more complete appreciation of the present invention, and many of the attendant advantages thereof, will be more readily obtained as the same becomes better understood by reference to the following figures in which:

FIG. 1A is a block diagram showing a configuration of a sensor module according to a first embodiment of the present invention;

FIG. 17 explains the second modified process;

FIGS. 18A and 18B show parallelism of magnetic fields;

DETAILED DESCRIPTION OF THE PREFERRED EMBODIMENTS

Figure 1B:
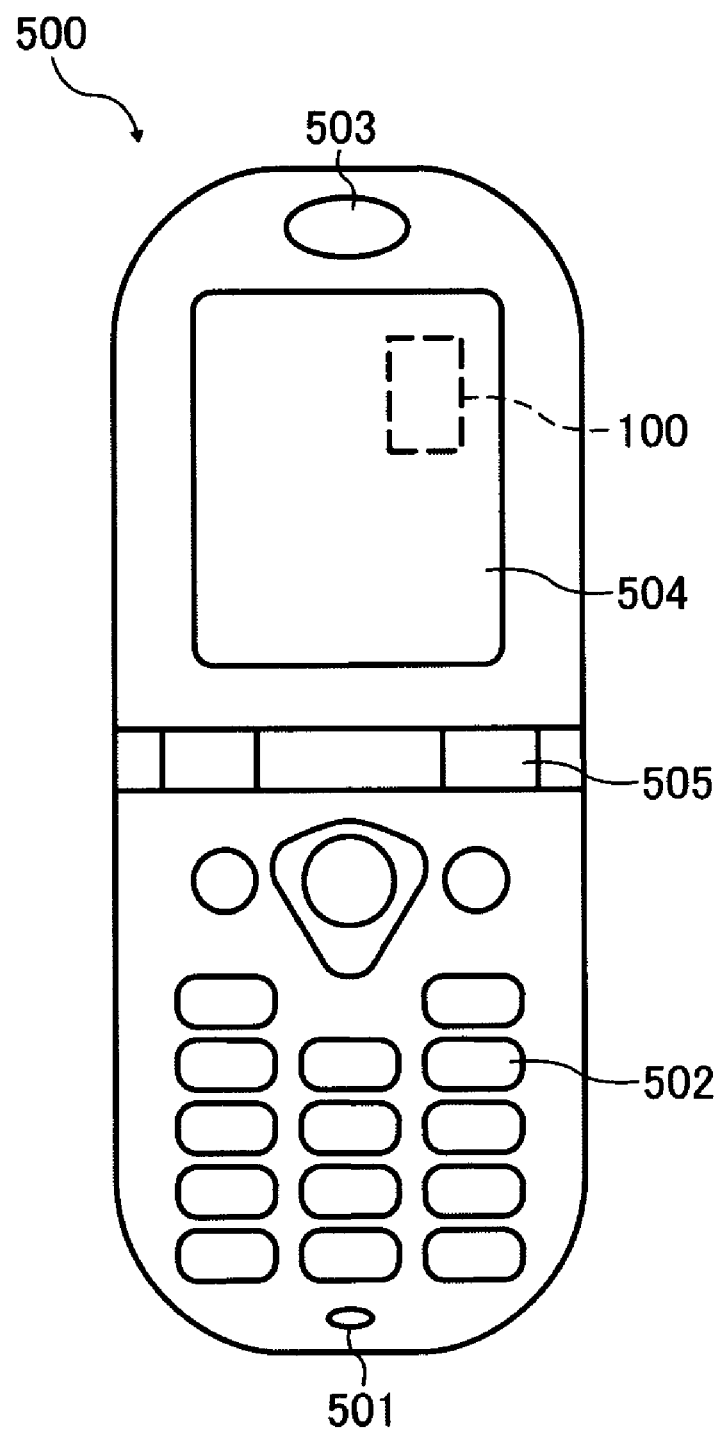
FIG. 1B shows a mobile object including the sensor module of the sensor module of FIG. 1A.

A first embodiment of the present invention is described below with reference to FIGS. 1A through 9. FIG. 1A schematically shows a configuration of a sensor module 100 according to one embodiment of the present invention.

The sensor module 100 is mounted on a mobile object, for example a car, a cellular phone, etc. The sensor module 100 includes a terrestrial magnetism sensor 11, a signal processing circuit 12 acquiring terrestrial magnetism data from an output signal of the terrestrial magnetism sensor 11, an acceleration sensor 21, a signal processing circuit 22 acquiring acceleration data from an output signal of the acceleration sensor 21, and an arithmetic device 30 acquiring an azimuth angle of a direction that the mobile object faces based on the output signal of the signal processing circuit 12 and the output signal of the signal processing circuit 22.

FIG. 1B schematically shows a cellular phone 500 equipped with the sensor module 100 as an example of the mobile object according to one embodiment of the present invention. The cellular phone 500 includes a microphone 501, an input operation part 502, a speaker 503, an LCD 504 as a display, a hinge part 505, and the sensor module 100. For example, the sensor module 100 is embedded at an underside of the LCD 504. In addition, for example, the direction that the cellular phone faces according to the first embodiment indicates the direction that the LCD 504 faces.

That is, one operation in the present invention is to determine a direction that a mobile object faces, and in that respect a reference portion of the mobile object is predetermined to determine a direction the mobile object faces. In the embodiment of the cellular phone 500, the LCD 504 can be viewed as a reference portion to determine a direction that the cellular phone 500 faces. That is, the direction that the LCD 504 faces is viewed as the direction that the cellular phone 500 faces.

Figure 2A:
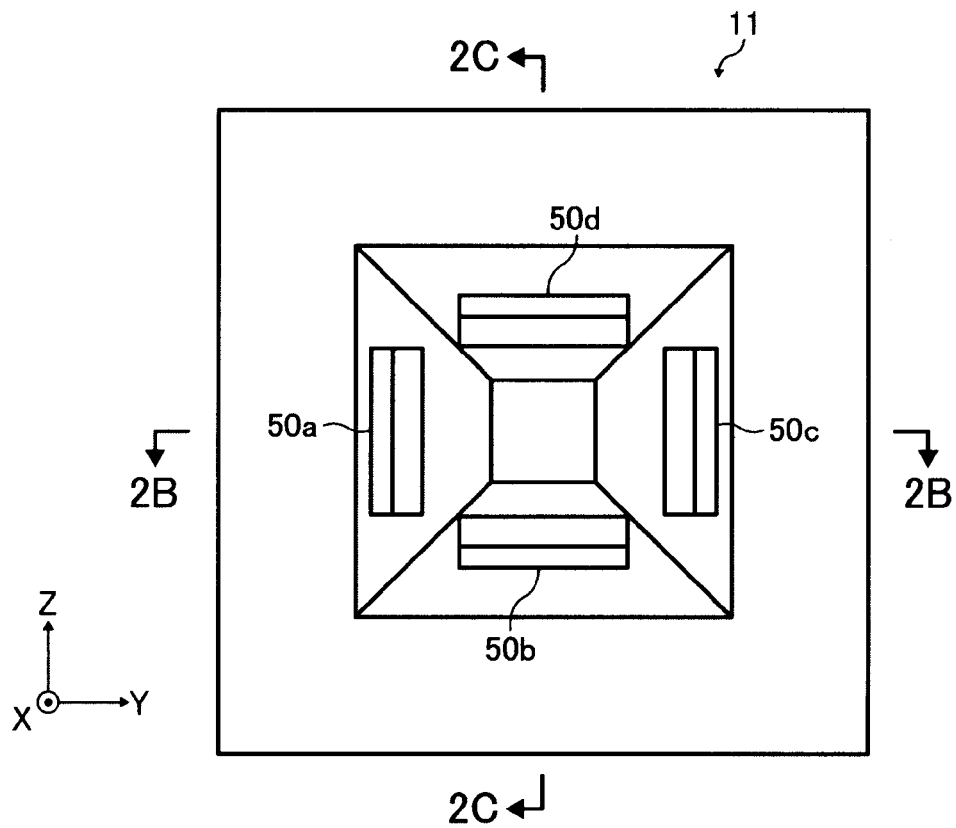
FIG. 2A is a top view of a terrestrial magnetism sensor shown in FIG. 1A.
Figure 2B:
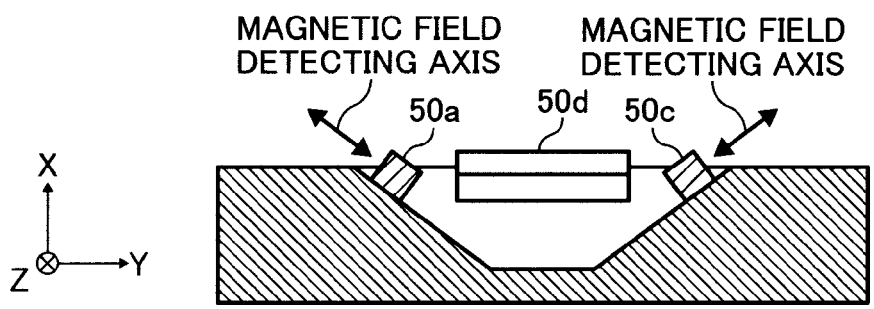
FIG. 2B is a side view of a terrestrial magnetism sensor shown in FIG. 1B.
Figure 2C:
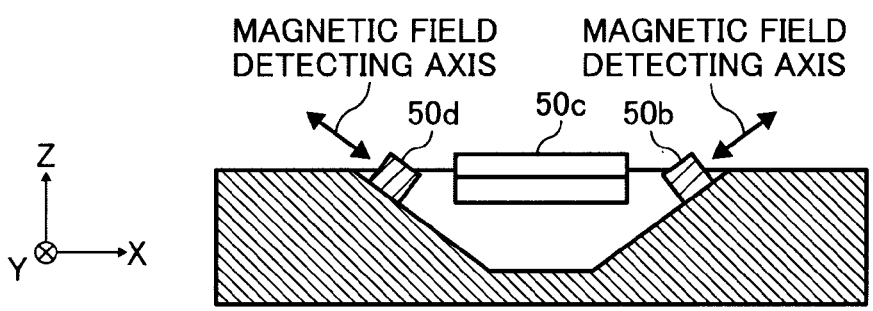
FIG. 2C is a side view of the terrestrial magnetism sensor shown in FIG. 1B.

The terrestrial magnetism sensor 11 is shown in further detail in FIG. 2A, FIG. 2B as a cross-section view along the line 2B-2B in FIG. 2A, and FIG. 2C as a cross-section view along the line 2C-2C in FIG. 2A. The terrestrial magnetism sensor 11, as an example, can be manufactured by an MEMS (Micro Electro Mechanical System) manufacturing process and includes four sensor parts 50a, 50b, 50c, and 50d that each have different directions of magnetic field detecting axes. For convenience, it is assumed that a direction of magnetic field detecting axes of the sensor part 50a is a first direction, a direction of magnetic field detecting axes of the sensor part 50b is a second direction, a direction of magnetic field detecting axes of the sensor part 50c is a third direction, and a direction of magnetic field detecting axes of the sensor part 50d is a fourth direction.

Figure 3:
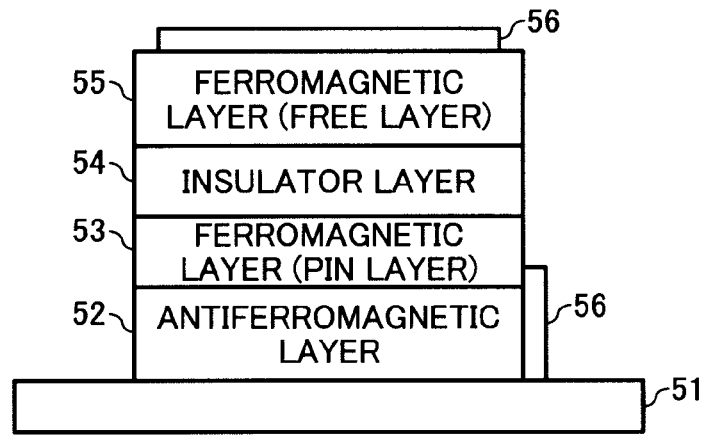
FIG. 3 is side view of a TMR element mounted on the terrestrial magnetism sensor of the first embodiment.

Each sensor part 50a-50d includes a magnetic resistance element, whose resistance value changes depending on a magnetic field. The magnetic resistance element, as shown in FIG. 3 as an example, is a tunneling magnetic resistance effect element (hereinafter referred to as a TMR element). A Fe—Mn film 52 as an antimagnetic layer, a Co—Fe film 53 as a ferromagnetic layer (pin layer), an organic film 54 as an insulator layer, and a permalloy film 55 as a ferromagnetic layer (free layer) stacked on a substrate 51 in this sequence form the magnetic resistance element. Element 56 of FIG. 3 indicates an electrode.

The terrestrial magnetism sensor 11 outputs a signal including magnetic information detected by the sensor part 50a (hereinafter called a first magnetic sensor signal), a signal including magnetic information detected by the sensor part 50b (hereinafter called a second magnetic sensor signal), and a signal including magnetic information detected by the sensor part 50c (hereinafter called a third magnetic sensor signal). As noted above, the terrestrial magnetism sensor 11 includes four sensor parts 50a-50d, but the operation in the present invention as discussed below only requires signals output from three of the sensor parts. Therefore, in this example given the signal output from sensor part 50d need not be considered. Of course that is an arbitrary distinction and any of three of the four sensors 50a-50d can be utilized to output signals.

Referring back to FIG. 1A, the signal processing circuit 12 includes a multiplexer 13, an amplifier 15, and an analog-to-digital converter 17.

The multiplexer 13 outputs the first magnetic sensor signal, the second magnetic sensor signal, and the third magnetic sensor signal in the same sequence as input from the terrestrial magnetism sensor 11. The amplifier 15 amplifies output signals from the multiplexer 13. The analog-to-digital converter 17 converts output signals from the amplifier 15 from analog to digital and outputs magnetic data. The magnetic data includes magnetic information regarding the first axis direction, the second axis direction, and the third axis direction.

Figure 4A:
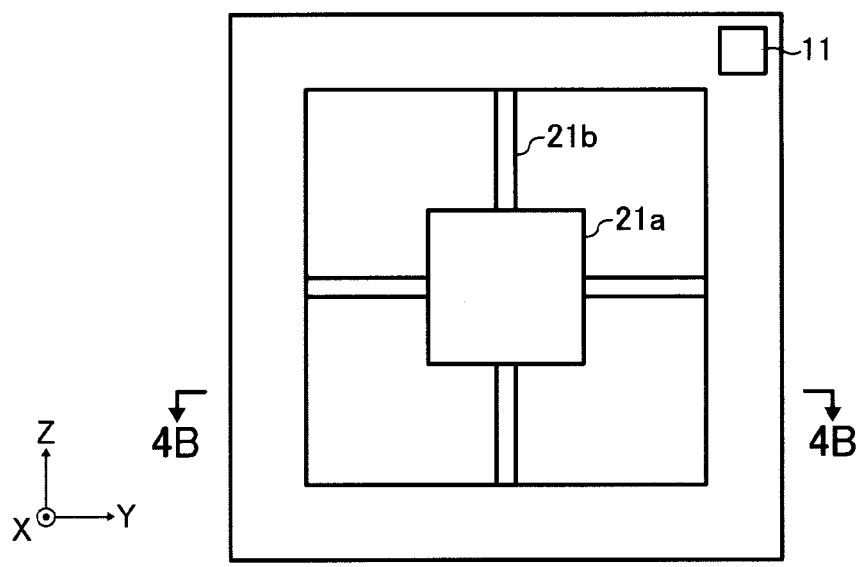
FIG. 4A is a top view of an acceleration sensor of the sensor module of FIG. 1A.
Figure 4B:
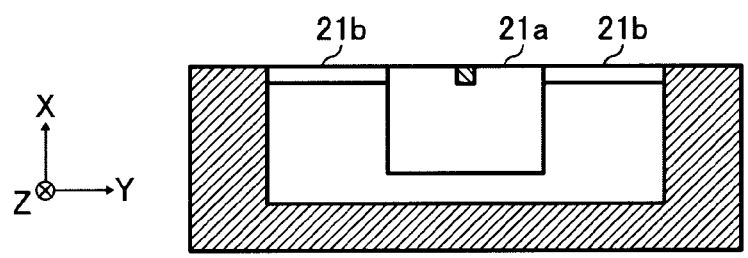
FIG. 4B is a side view of the acceleration sensor shown in FIG. 1B.
Figure 5:
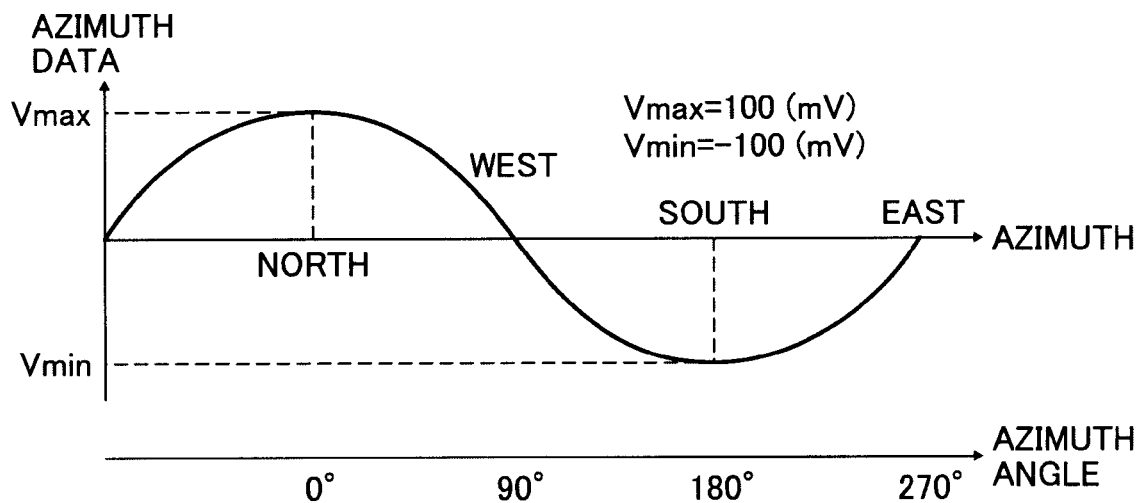
FIG. 5 shows a relation between azimuth data and an azimuth angle.

The acceleration sensor 21 is based on a piezo electrode and has three axes. The acceleration sensor, as shown in FIG. 4A and FIG. 4B, FIG. 4B being a cross-section view along the line 4B-4B in FIG. 4A, as an example, is formed square-shaped, with each side about 1 mm long, as an example. A weight 21a and a brace beam 21b achieving a piezo effect can be manufactured by an MEMS manufacturing process. The acceleration sensor 21 outputs a signal including information regarding acceleration with respect to gravity (hereinafter called a first acceleration sensor signal), a signal including acceleration information regarding acceleration with respect to the Y axis direction (hereinafter called a second acceleration sensor signal), and a signal including acceleration information regarding acceleration with respect to the Z axis direction (hereinafter called a third acceleration sensor signal).

A part of the acceleration sensor 21, as shown in a FIG. 4A as an example, includes the terrestrial magnetism sensor 11. Therefore, the acceleration sensor 21 and the terrestrial magnetism sensor 11 can be integrally formed.

Referring back to FIG. 1A, the signal processing circuit 22 includes a multiplexer 23, an amplifier 25, and an analog-to-digital converter 27.

The multiplexer 23 outputs the first acceleration sensor signal, the second acceleration sensor signal, and the third acceleration sensor signal in the same sequence as input from the acceleration sensor 21. The amplifier 25 amplifies output signals from the multiplexer 23. The analog-to-digital converter 27 converts output signals from the amplifier 25 from analog to digital and outputs acceleration data. The acceleration data includes the information regarding acceleration with respect to gravity and the acceleration information regarding acceleration with respect to the Y axis and Z axis directions.

The arithmetic device 30 includes a CPU 31, a ROM 32, and a memory 35.

ROM 33 stores programs described by a code decodable by the CPU 31, initial data, and fixed data. The memory 35 stores the magnetic data from the signal processing circuit 12, the acceleration data from the signal processing circuit 22, and correction data for correcting the magnetic data, and so on. The memory 35 also includes a working area for the CPU 31.

The CPU 31 performs processes based on programs stored in the ROM 33.

In a device such as in the present invention, when utilizing a magnetic sensor, the magnetic sensor ideally only detects terrestrial magnetism, and can thereby determine an azimuth or other measurement based on the detected terrestrial magnetism. However, such a magnetic sensor may also receive extraneous magnetic fields from circuitry, metal objects, etc. in close proximity to the magnetic sensor. Therefore, a magnetic sensor may store correction data to offset the impact of such extraneous magnetic fields on the magnetic sensor.

A feature in the present invention is to provide accurate updating of such correction data. Specifically, in one feature the present invention determines an appropriate time to update such correction data. The inventors of the present invention recognized that when the magnetic sensor is subject to stable magnetic fields is an appropriate time to update such correction data. Thereby, in an operation of the present invention as discussed below, the correction data is only updated at a time a magnetic field detected by the magnetic sensor is substantially stable, e.g., is within a specifically defined band.

The CPU 31 calculates azimuth data based on magnetic information regarding the first axis direction, the second axis direction, and the third axis direction that the magnetic data from the signal processing circuit 12 generates, and acquires an azimuth angle of a direction that the mobile object faces. As shown in a FIG. 5 as an example, the azimuth data indicates the maximum value Vmax (=100 mV) in the case that the mobile object faces north and the azimuth data indicates the minimum value Vmin (=−100 mV) in the case that the mobile object faces south if the mobile object is only subject to the terrestrial magnetic field at its position (hereinafter this situation is called the criterion field state). And FIG. 5 indicates an azimuth angle in the case that a direction of north is defined as a criterion (0°). The ROM 33 stores data of a relationship between the azimuth data and the azimuth angle in the form of a table or a formula as the fixed data.

The CPU 31 also calculates inclination data to a gravity direction based on information regarding the gravity that the acceleration data from the signal processing circuit 22 generates, and acquires an inclination angle of the mobile object to the gravity direction.

Figure 6:
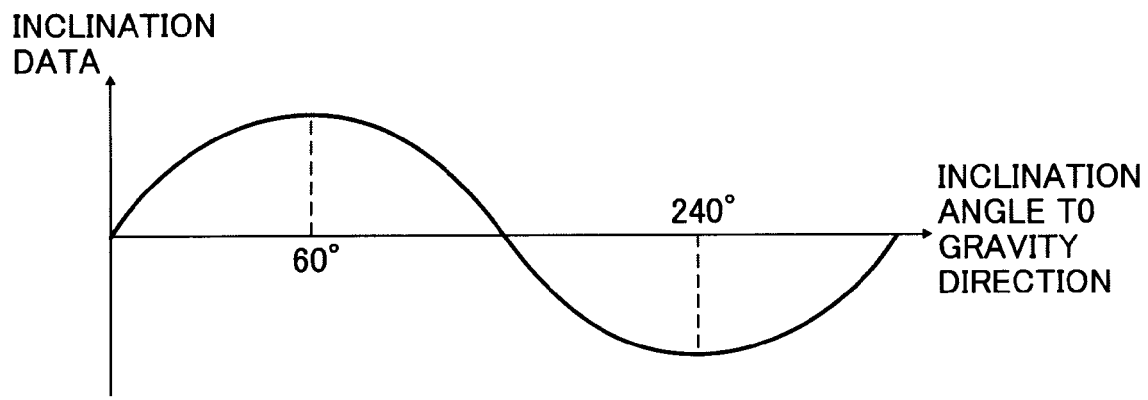
FIG. 6 shows a relation between inclination data and an inclination angle to the gravity direction.

As shown in a FIG. 6 as an example, the inclination data indicates the maximum value in the case that the inclination angle is 60° and the inclination data indicates the minimum value in the case that the inclination angle is 240°. Therefore, the inclination data indicates the maximum value Vmax in the case that the mobile object faces north and the inclination data indicates the minimum value in the case that the mobile object faces south. The ROM 33 stores data of a relationship between the inclination data and the inclination angle in the form of a table or a formula as the fixed data.

Figure 7:
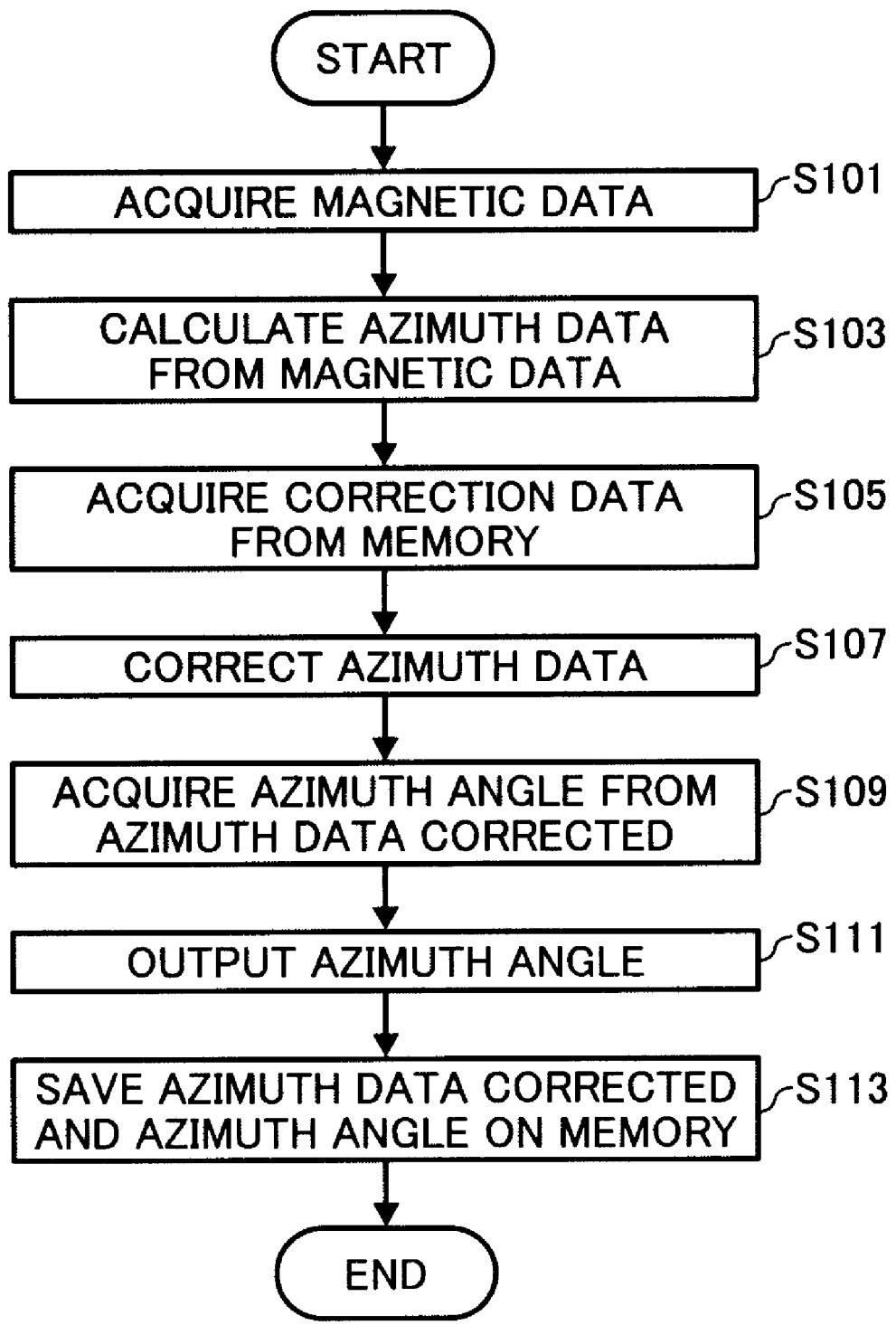
FIG. 7 is a flowchart showing processes to acquire an azimuth angle according to the first embodiment.

Next, a behavior of the sensor module 100 is described below with reference to FIG. 7 through FIG. 9. Flow charts of FIG. 7 through FIG. 9 correspond to a processing algorithm carried out by the CPU 31.

When the azimuth angle of a direction that the mobile object faces is requested by, for example, a timer interrupt, a start address of a program corresponding to FIG. 7, which is one of programs stored in ROM 33, is set on program counter of the CPU 31 and a process (hereinafter called an azimuth acquiring process) starts. In this case the memory 35 already stores the correction data. As discussed in the following process, one feature in the present invention is to update that already stored correction data at a time when the magnetic field sensed is stable.

In the first step S101, CPU 31 acquires magnetic data through the signal processing circuit 12.

In the next step S103, CPU 31 calculates azimuth data based on the magnetic information regarding the first axis direction, the second axis direction, and the third axis direction included in the magnetic data.

In the next step S105, the CPU 31 acquires correction data from the memory 35.

In the next step S107, the CPU 31 corrects the azimuth data based on the correction data. For example, the azimuth data corrected indicates 80×1.25=100 mV in the case that the azimuth data calculated is 80 mv and the correction data is 1.25.

In the next step S109, the CPU 31 acquires the azimuth angle of the direction that the mobile object faces in reference to the relationship between the azimuth data and the azimuth angle stored in ROM 33. For example, the azimuth angle indicates 0 in the case that the azimuth data is corrected to 100 mV.

In the next step S111, the CPU 31 outputs the acquired azimuth angle. The azimuth angle is stored in the memory 35 of the mobile object and is used, e.g., for a navigation system.

In the next step S113, the CPU 31 saves the corrected azimuth data and the acquired azimuth angle in the memory 35. Then, the azimuth acquiring process ends.

When updating of the correction data is requested by, for example, a timer interrupt, a start address of a program shown in FIG. 8 and FIG. 9, which is one of programs stored in ROM 33, is set on program counter of the CPU 31 and a process (hereinafter called a first correction data updating process) starts.

In the first step S201, the CPU 31 sets a counter value to 1.

In the present invention it is required that a multiple number of acceleration data be utilized to form a fluctuation band. The number of acceleration data needed must be at least 2, but the number of acceleration data may be larger to increase accuracy, for example can be on the order of 100-200 samples. The greater the number of acceleration data used the more accurate the operation as the more accurate the fluctuation band. In the following embodiments the desired number of acceleration data is set at a value N, and the following operations in the present invention are executed to obtain those N number of acceleration data samples.

In the next step S203, CPU 31 acquires acceleration data through the signal processing circuit 22.

In the next step S205, the CPU 31 saves the acquired acceleration data in the memory 35.

In the next step S207, the CPU 31 judges whether a value in the counter is equal to the integer N, being more than 2, or not, i.e. have the desired number of samples of acceleration data been obtained. If, the judgment indicates NO the first correction data updating process proceeds to a step S209 because the value in the counter is less than n.

In the next step S209, the CPU 31 adds 1 to the value in the counter. The first correction data updating process then returns to step S203 after waiting for a predetermined time (for example 100 ms).

The CPU 31 then repeats steps S203 through S209 until the judgment in step S207 indicates YES, i.e., until the value in the counter equals N.

When the value in the counter is equal to N, the judgment in step S207 indicates YES and the first correction data updating process proceeds to a step S211. At this time, N acceleration data acquired at different timings have been saved in memory 35.

In the next step S211, the CPU 31 reads the acceleration data saved in memory 35, obtains fluctuation bands of acceleration regarding a gravity direction and a direction of the Y-axis and Z-axis, and acquires the large fluctuation band dA in the fluctuation bands.

In the next step S213, the CPU 31 judges whether the fluctuation band dA is less than the threshold value dAt or not. The judgment indicates YES in the case that the fluctuation band dA is less than the threshold value dAt, and the first correction data updating process then proceeds to step S251 (FIG. 9). At that time, the threshold value dAt is 0.5% against 1 G (the gravity acceleration) or 0.5 mV converted by an electric signal.

In the step S251, the CPU 31 stops supplying power to a speaker of the mobile object in the example of a cellular phone.

In the next step S253, the CPU 31 calculates the inclination data to the gravity direction based on the information regarding the gravity included in the acceleration data.

In the next step S255, the CPU 31 acquires the inclination angle to the gravity direction of the mobile object in reference to the relationship between the inclination data and the inclination angle stored in ROM 33.

In the next step S257, the CPU 31 subtracts an adjustment angle from the acquired inclination angle and acquires the value Da. For example, the adjustment angle a may be 60° if the inclination angle is larger than the azimuth angle, the difference being 60° in reference to FIGS. 5 and 6, in the case that the criterion of the azimuth defines north. Da and the azimuth angle are equal each other in the criterion field state. And, the adjustment angle is 0° in the case that the azimuth angle defines 60°. In sum, the adjustment angle is not required.

In the next step S259, CPU 31 acquires magnetic data through the signal processing circuit 12.

In the next step S261, CPU 31 calculates azimuth data based on the magnetic information regarding the first axis direction, the second axis direction, and the third axis direction included in the magnetic data.

In the next step S263, the CPU 31 acquires the correction data stored in the memory 35.

In the next step S265, the CPU 31 corrects the azimuth data based on the correction data.

In the next step S267, the CPU 31 acquires the azimuth angle Dm of the direction that the mobile object faces in reference to the relationship between the azimuth data and the azimuth angle stored in ROM 33.

In the next step S269, the CPU 31 judges whether the difference between the azimuth angles Dm and Da is less than the threshold value Dt or not. The judgment indicates YES in the case that the difference between the azimuth angle Dm and Da is less than the threshold value Dt, and the first correction data updating process then proceeds to step S271. At this time the threshold value Dt is 0.5° as a relative value of the azimuth angle or 0.5 mV converted by an electric signal.

In the next step S271, the CPU 31 recalculates correction data. For example, the CPU 31 acquires the azimuth data Vx when the inclination angle is 60°, and the value of Vmax divided by Vx becomes the new correction data.

In the next step S273, the CPU 31 replaces the correction data stored in memory 35 with the recalculated correction data. In sum, the CPU 31 updates the correction data. The first correction data updating process then ends.

In addition, in the step S213, the judgment indicates NO in the case that the fluctuation band dA is not less than the threshold value dAt, and then the first correction data updating process ends. In that case, the CPU 31 does not update the correction data.

In addition, in the step S269, the judgment indicates NO in the case that the difference between the azimuth angle Dm and Da is not less than the threshold value Dt, and then the first correction data updating process ends. In that case, the CPU 31 also does not update the correction data.

As evident from the description above, the processing device includes the signal processing circuit 12, the signal processing circuit 22, and the arithmetic device 30 in the sensor module 100 according to the first embodiment of the present invention. Hardware may also execute at least a part of processes executed by the program of CPU 31 or whole parts thereof.

Figure 8:
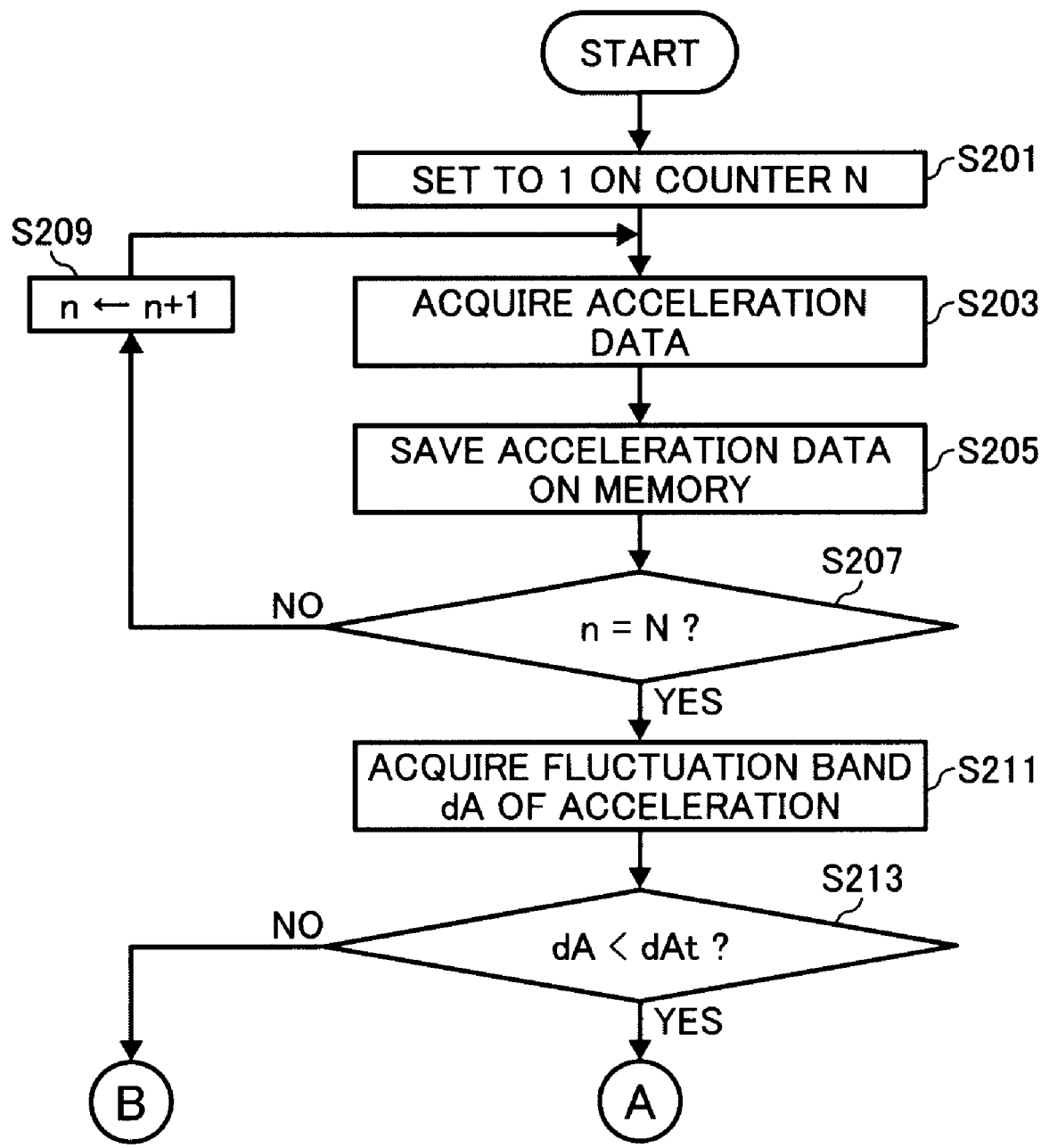
FIG. 8 is a flowchart showing processes to update correction data according to the first embodiment.
Figure 9:
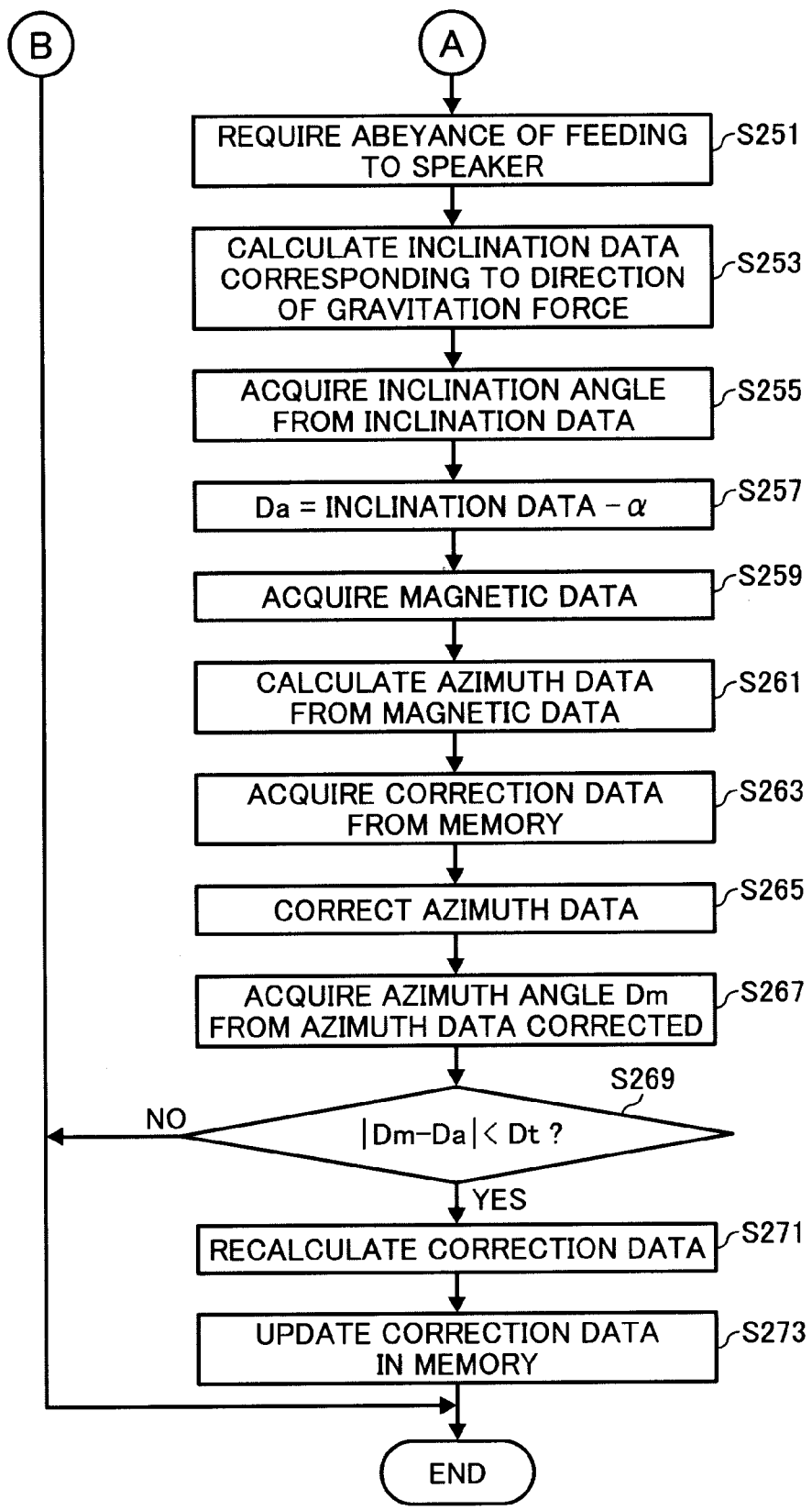
FIG. 9 is a flowchart showing processes to update correction data according to the first embodiment.

In the above embodiment, the programs corresponding to FIG. 8 and FIG. 9 are programs stored in ROM 33 as a recording medium. Thereby, the first correction data updating process operates a correction method according to the present invention.

As described above, the correction data is updated only in the case that the fluctuation band acquired from the output signal of the acceleration sensor 21 is less than the threshold value and the difference between the azimuth angle acquired from the output signal of the terrestrial magnetism sensor 11 and the inclination angle acquired from the output signal of acceleration sensor 21 is less than the threshold value in the sensor module, according to the above first embodiment.

Therefore, the correction data is updated only in the case that a stable magnetic field is sensed at a position of the mobile object. Thereby, the present invention can maintain high accuracy of correction data and can maintain high accuracy of detection.

Further in the first embodiment, the sensor module can be miniaturized considerably because the terrestrial magnetism sensor 11 and the acceleration sensor 21 can be manufactured by the MEMS manufacturing process and the terrestrial magnetism sensor 11 and the acceleration sensor 21 are monolithic.

Figure 10:
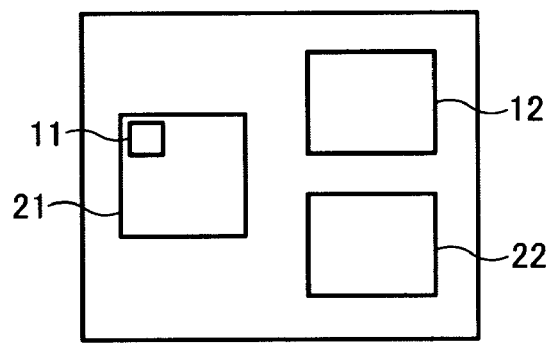
FIG. 10 shows unifying each signal processing circuit and each sensor in the first embodiment.

Further in the first embodiment, as shown in FIG. 10 as an example, the terrestrial magnetism sensor 11, the acceleration sensor 21, the signal processing circuit 12, and the signal processing circuit 22 may be monolithic. Therefore, the sensor module 100 can be miniaturized as well, and the monolithic configuration can constrain signals output from each sensor from being mixed with noise, and therefore the sensor module can increase its accuracy of detection as well.

Figure 11:
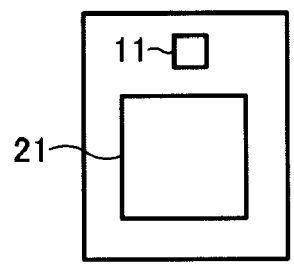
FIG. 11 shows unifying each terrestrial magnetism sensor and each acceleration sensor in the first embodiment.
Figure 12:
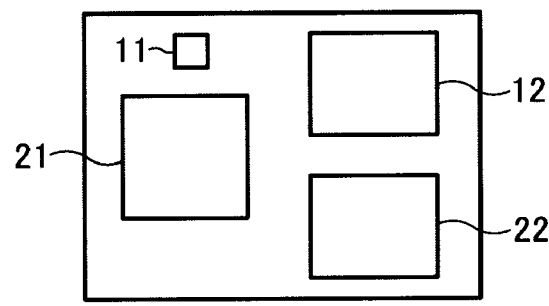
FIG. 12 shows unifying each terrestrial magnetism sensor, each acceleration sensor, and each signal processing circuit in the first embodiment.

Further in the first embodiment, as shown in FIG. 11 as an example, the terrestrial magnetism sensor 11 and the acceleration sensor 21 may be individually formed. Even that configuration can miniaturize the sensor module to be smaller than conventional technology. Further in this case, as shown in FIG. 12 as an example, the signal processing circuit 12 and the signal processing circuit 22 may be monolithic as well.

Figure 13:
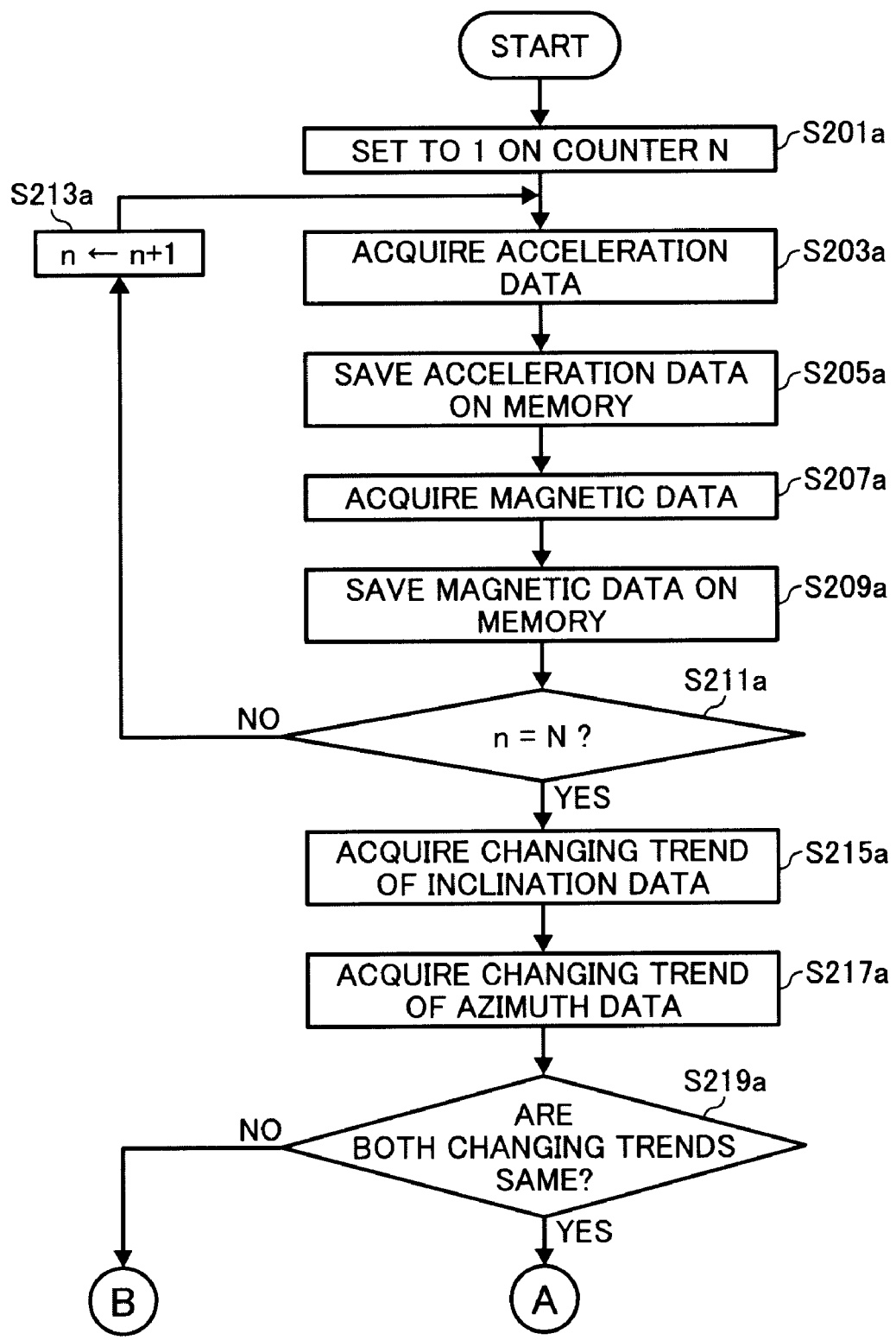
FIG. 13 is a flowchart showing a first modified process to update correction data according to the first embodiment.

Further in the first embodiment, the first correction data updating process judges whether updating correction data is adequate or not at a time in reference to the fluctuation band dA of acceleration at first. However, the first correction data updating process may judge whether updating correction data is adequate or not at that time in reference to a changing trend of the azimuth data according to a changing trend of a detected magnetic field and a changing trend of the inclination data according to a changing trend of a rotation angle. A behavior of the sensor module 100 in this case is described below with reference to FIG. 13.

In the first step S201a, the CPU 31 sets a counter value to 1. Again in this case N acceleration reading samples are desired to accurately make the fluctuation bands, although N could be as small as 2.

In the next step S203a, CPU 31 acquires acceleration data through the signal processing circuit 22.

In the next step S205a, the CPU 31 saves the acquired acceleration data in the memory 35.

In the next step S207a, the CPU 31 acquires magnetic data through the signal processing circuit 12.

In the next step S209a, the CPU 31 saves the acquired magnetic data in the memory 35.

In the next step S211a, the CPU 31 judges whether a value in the counter is equal to an integer N or not. If the judgment indicates NO the first correction data updating process proceeds to a step S213a as the value in the counter is less than N.

In the step S213a, the CPU 31 adds 1 to the value in the counter. The first correction data updating process then returns to step S203a after waiting for a predetermined time (for example 100 ms).

Hereinafter, the CPU 31 repeats steps S203a through S213a until the judgment in step S211a indicates YES.

When the value in the counter is equal to N, the judgment in step S211a indicates YES and the first correction data updating process proceeds to a step S215a. At this time, an adequate and desired number N of acceleration data and the inclination data acquired at different timings have been saved in memory 35.

In the step S215a, the CPU 31 reads the acceleration data saved in memory 35, calculates inclination data, and acquires the changing trend of the inclination data.

In the next step S217a, the CPU 31 reads the magnetic data saved in memory 35, calculates azimuth data, and acquires the changing trend of the azimuth data.

Figure 14A:
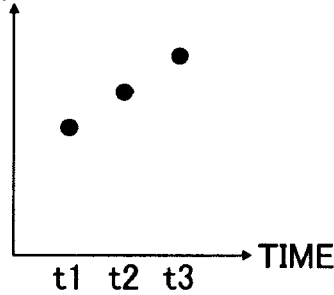
FIGS. 14A, 14B, and 14C show a case that changing trends of inclination data and azimuth data are the same as each other.
Figure 14A:
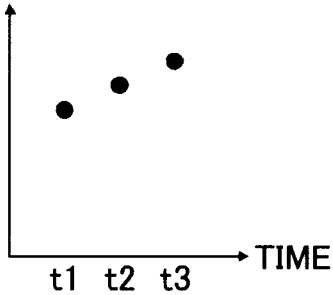
Figure 14B:
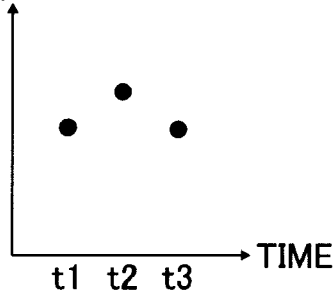
Figure 14B:
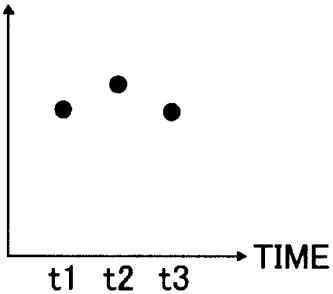
Figure 14C:
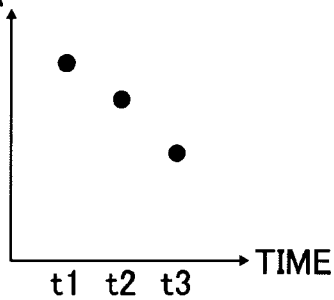
Figure 14C:
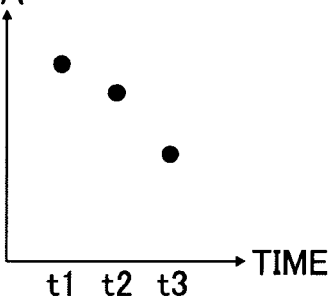
Figure 15A:
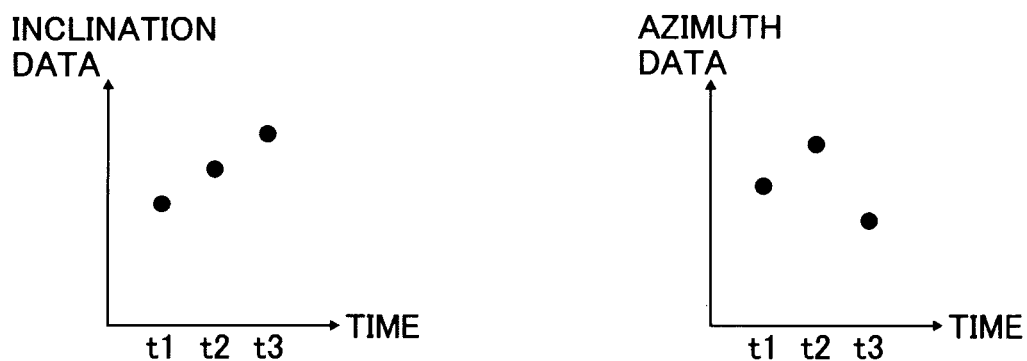
FIGS. 15A, 15B, and 15C show a case that a changing trend of inclination data is different from one of azimuth data.
Figure 15B:
Figure 15C:
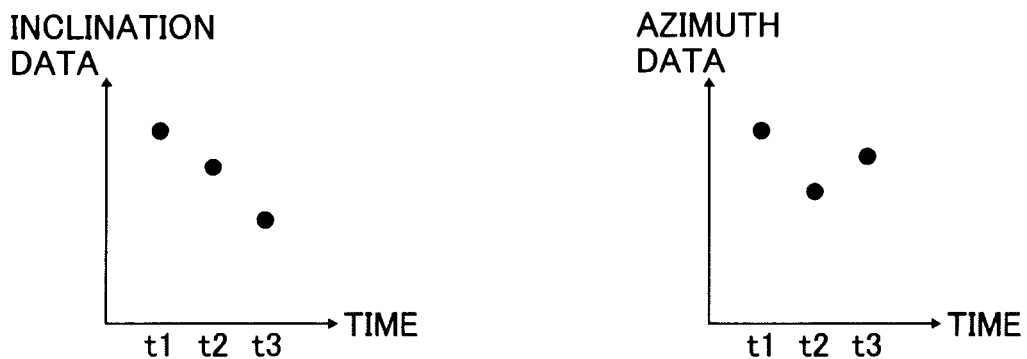

In the next step S219a, the CPU 31 judges whether the changing trend of the inclination data and the changing trend of the azimuth data are the same as each other or not. As shown in FIGS. 14A through 14C as examples, the judgment indicates YES in the case that the changing trend of the inclination data is the same as the changing trend of the azimuth data, and then the first correction data updating process proceeds to step S251. At that time, the threshold value dAt is 0.5% against 1 G (the gravity acceleration) or 0.5 mV converted by an electric signal. In contrast, as shown in FIGS. 15A through 15C as examples, the judgment indicates NO in the case that the changing trend of the inclination data is different from the changing trend of the azimuth data, and then the first correction data updating process ends. In this case, the CPU 31 does not update the correction data. In addition, t1 corresponds to n=1, t2 corresponds to n=2, and t3 corresponds to n=3 in FIGS. 14A through 14C and FIGS. 15A through 15C.

Figure 16:
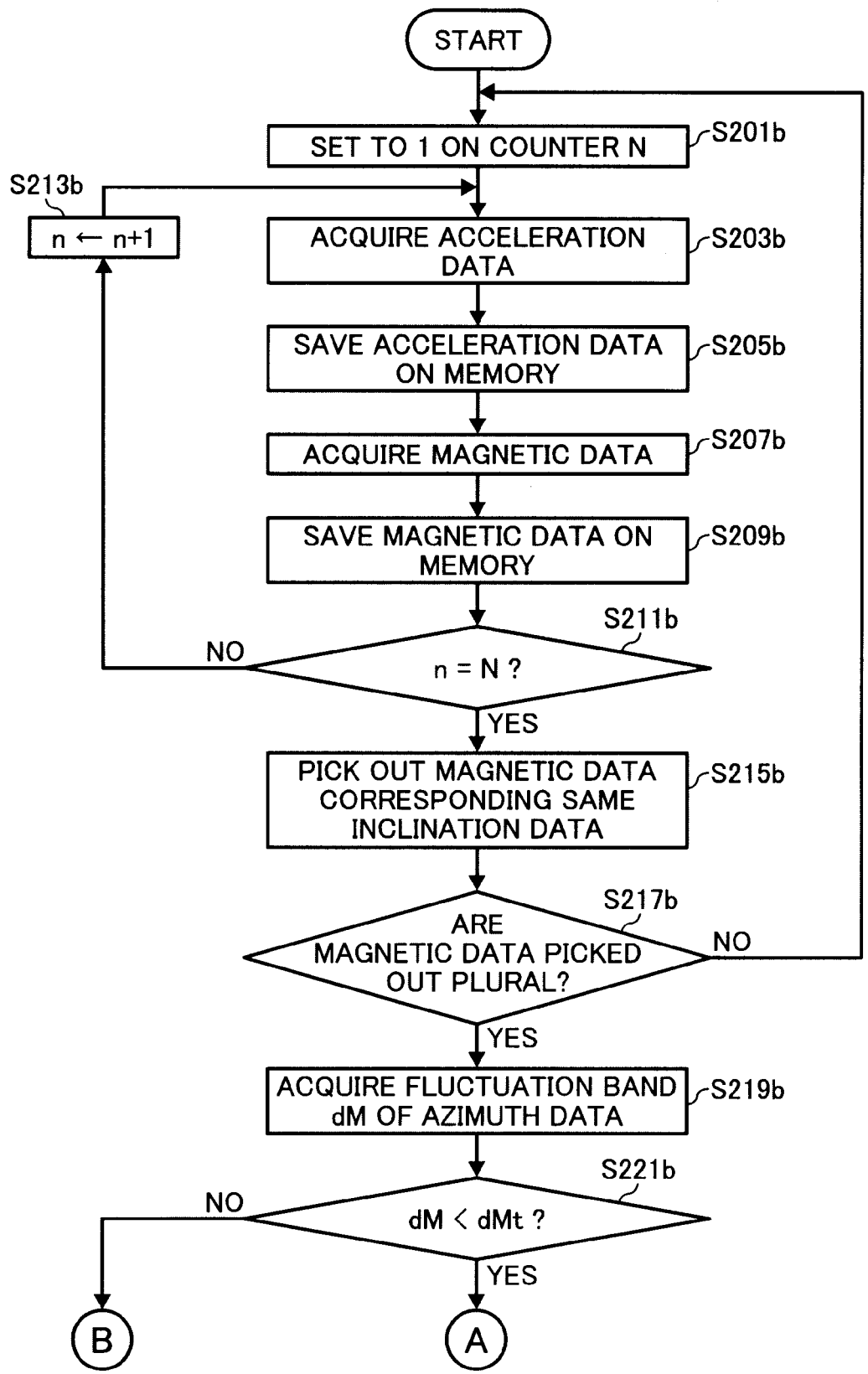
FIG. 16 is a flowchart showing a second modified process to update correction data according to the first embodiment.

Further, the first correction data updating process may judge whether updating correction data is adequate or not in reference to a parallelism of a magnetic field at a position of the mobile object as well. A behavior of the sensor module 100 in this case is described below with reference to FIG. 16.

The steps S201b through S213b are same as the steps S201a through S213a.

When the value on the counter is equal to N, the judgment in step S211b indicates YES and the first correction data updating process proceeds to a step S215b. At this time, the acceleration data and the inclination data acquired at different timings from each other have been saved in memory 35.

In the step S215b, the CPU 31 reads the acceleration data saved in memory 35 and calculates inclination data. The CPU 31 also picks out the magnetic data corresponding to the same inclination data. For example, as shown in FIG. 17, the CPU 31 picks up magnetic data Dj2, Dj3, Dj4, and Dj5 corresponding to the inclination data k2 because a number of the inclination data k2 is most when k1, k2, and k3 are calculated as the inclination data. The CPU 31 can judge that the mobile object is not rotated in n=2, 3, 4, and 5.

In the next step S217b, the CPU 31 judges whether the magnetic data picked up is plural or not. The judgment indicates NO in the case that the magnetic data is not plural, and then the first correction data updating process returns to step S201b. In contrast, the judgment indicates YES in the case that the magnetic data is plural, and then the first correction data updating process proceeds to step S219b.

In the step S219b, the CPU 31 calculates each azimuth data from plural magnetic data picked up and acquires the fluctuation band dM of the azimuth data. The fluctuation band corresponds to a declination angle from a parallel direction of the magnetic field.

In the next step S221b, the CPU 31 judges whether the fluctuation band dM is less than the threshold value dMt or not. As shown in FIG. 18A as an example, the judgment indicates YES in the case that the fluctuation band dM is less than the threshold value dMt (for example 0.1°); in that case the magnetic field is parallel. Then, the first correction data updating process proceeds to step S251. In contrast, as shown in FIG. 18B as an example, the judgment indicates NO in the case that the fluctuation band dM is not less than the threshold value dMt, in that case the magnetic field is not parallel. Then, the first correction data updating process ends. In that case, the CPU 31 does not update the correction data.

Further in the above embodiment, the CPU 31 can skip the step that judges whether updating correction data is adequate at the time or not in reference to the fluctuation band dA of acceleration, to reduce a process time.

Figure 19:
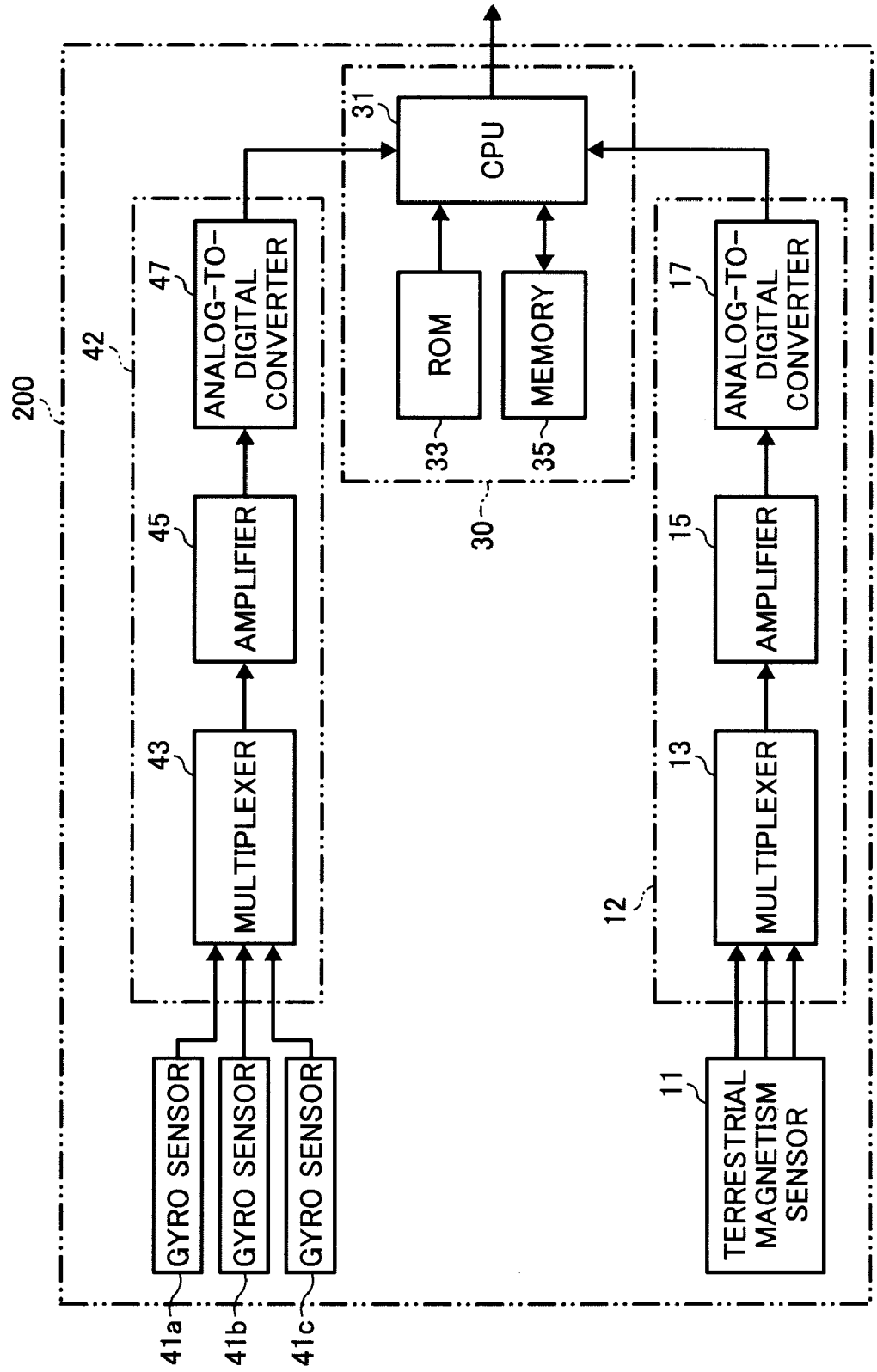
FIG. 19 a block diagram showing a configuration of a sensor module according to a second embodiment of the present invention.

A further second embodiment of the present invention is described below with reference to FIG. 19 through FIG. 22. FIG. 19 schematically shows a configuration of a sensor module 200 according to the second embodiment of the present invention. The sensor module 200 includes three gyro sensors 41a, 41b, and 41c as a substitute for the acceleration sensor 21 in the first embodiment described above. Therefore, the sensor module 200 includes a signal processing circuit 42 acquiring gyro data from output signals of each gyro sensor 41a, 41b, and 41c as a substitute for the signal processing circuit 22 of the sensor module 100. Therefore, the following discussion will mainly describe the differences from the first embodiment, using the same reference symbols as in the first embodiment for the same or equivalent parts as in the first embodiment, and descriptions of the same parts may be omitted.

All of three gyro sensors 41a, 41b, and 41c are piezoelectric gyro sensors and have different directions of magnetic field detecting axes from each other. For convenience, it is assumed gyro sensor 41a outputs a signal including angular rate information regarding the X-axis direction (hereinafter called a first angular rate sensor signal), gyro sensor 41b outputs a signal including angular rate information regarding the Y-axis direction (hereinafter called a second angular rate sensor signal), and a gyro sensor 41c outputs a signal including angular rate information regarding the Z-axis direction (hereinafter called a third angular rate sensor signal).

Figure 20A:
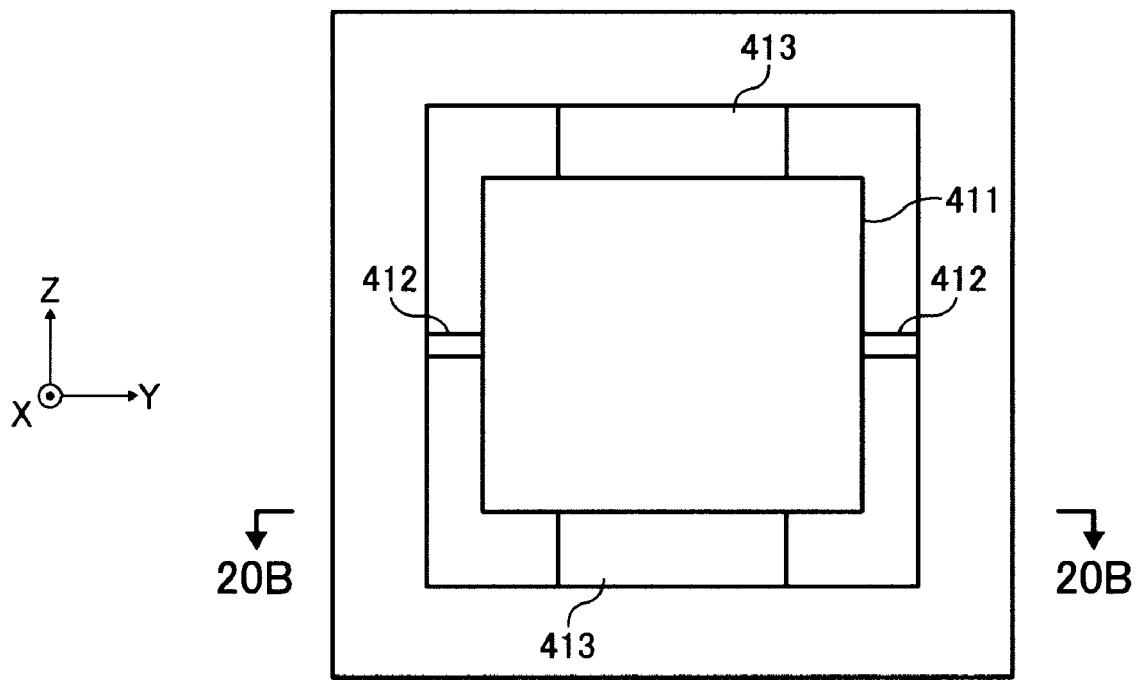
FIG. 20A is a top view of a gyro sensor shown in FIG. 19.
Figure 20B:
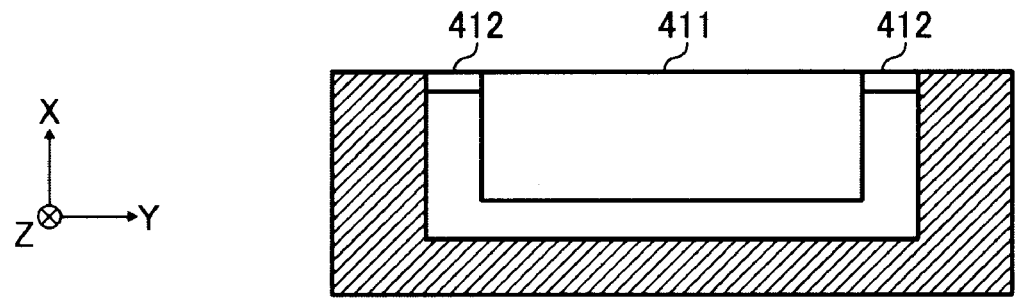
FIG. 20B is a side view of the gyro sensor shown in FIG. 19.

Weights, brace beams achieving a piezo effect, and oscillation driving parts of each gyro sensor can be manufactured by an MEMS manufacturing process. As a representative for each of the gyro sensors 41a-41c, FIG. 20A and FIG. 20B, which is a cross-section view along the line 20B-20B in FIG. 20A, show the gyro sensor 41b. Each element 411, 412, and 413 indicates the weight, the brace beam, and the oscillation driving part in FIGS. 20A and 20B. Each gyro sensor can detect a first temporal differentiation value of an angular rate, in turn a rotation angle, and therefore an angular rate can be acquired by temporal integrating the first temporal differentiation value.

Referring back to FIG. 19, the signal processing circuit 42 includes a multiplexer 43, an amplifier 45, and an analog-to-digital converter 47.

The multiplexer 43 outputs the first angular rate sensor signal from the gyro sensor 41a, the second angular rate sensor signal from the gyro sensor 41b, and the third angular rate sensor signal from gyro sensor 41c in the sequence as input. The amplifier 45 amplifies output signals from the multiplexer 43. The analog-to-digital converter 47 converts output signals from the amplifier 45 from analog to digital and outputs gyro data. The gyro data includes angular rate information regarding the X-axis direction, the Y-axis direction, and the Z-axis direction.

Next, an operation of the sensor module 200 as described above is described below with reference to FIG. 21 and FIG. 22. Flow charts of FIG. 21 and FIG. 22 correspond to a processing algorithm carried out by the CPU 31. The memory 35 already stores the correction data.

The azimuth angle acquiring process operates the same as in the first embodiment.

When updating of the correction data is requested by, for example, a timer interrupt, a start address of a program corresponding to FIG. 21 and FIG. 22, which is one of programs stored in ROM 33, is set on program counter of the CPU 31 and a process (hereinafter called a second correction data updating process) starts.

In the first step S301, the CPU 31 sets a counter value to 1, and N acceleration data readings are again desired, as in the first embodiment.

In the next step S303, CPU 31 acquires gyro data through the signal processing circuit 42.

In the next step S305, the CPU 31 saves the acquired gyro data in the memory 35.

In the next step S307, the CPU 31 judges whether a value in the counter is equal to the integer N or not. If the judgment indicates NO the first correction data updating process proceeds to a step S309 because the value in the counter is less than N.

In the step S309, the CPU 31 adds 1 to the value in the counter. The second correction data updating process then returns to step S303 after waiting for a predetermined time (for example 100 ms).

Hereinafter, the CPU 31 repeats steps S303 through S309 until the judgment in step S307 indicates YES.

When the value in the counter is equal to N, the judgment in step S307 indicates YES and the second correction data updating process proceeds to a step S311. At this time, the acceleration data acquired at different timings from each other have been stored in memory 35.

In the step S311, the CPU 31 reads the gyro data saved in memory 35 and calculates a rotation angle Ra.

In the next step S313, the CPU 31 judges whether the rotation angle Ra is less than a threshold value Rat or not. The judgment indicates YES in the case that the rotation angle Ra is less than the threshold value Rat, and then the second correction data updating process proceeds to step S351. At this time, the threshold value Rat is 0.5° as a relative value or 0.5 mV converted by an electric signal.

In the step S351, the CPU 31 stops feeding power to a speaker of the mobile object in the example of a cellular phone.

In the next step S353, the CPU 31 calculates the azimuth angle Db from the rotation angle Ra. It assumed the azimuth angle before rotating is already known.

The steps S355 through S363 are the same as the steps S259 through S267, and thus are not further described.

In the next step S365, the CPU 31 judges whether the difference between the azimuth angle Dm and Db is less than the threshold value Dt or not. The judgment indicates YES in the case that the difference between the azimuth angle Dm and Db is less than the threshold value Dt, and in that case the second correction data updating process proceeds to step S367.

In the step S367, the CPU 31 recalculates correction data. For example, the CPU 31 acquires the azimuth data Vx' when the azimuth angle is 0°, the value being Vmax divided by Vx' becoming new correction data.

In the next step S369, the CPU 31 replaces the correction data saved in memory 35 with the recalculated correction data. In sum, the CPU 31 updates the correction data. Then, the second correction data updating process ends.

In addition, in the step S313, the judgment indicates NO in the case that the rotation angle Ra is not less than the threshold value Rat, and in that case the second correction data updating process ends. In that case, the CPU 31 does not update the correction data.

In addition, in the step S365, the judgment indicates NO in the case that the difference between the azimuth angle Dm and Db is not less than the threshold value Dt, and in that case the second correction data updating process ends. In that case, the CPU 31 does not update the correction data.

As evident from the description above, the processing device includes the signal processing circuit 12, the signal processing circuit 42, and the arithmetic device 30 in the sensor module 200 according to this second embodiment of the present invention. Hardware may execute at least a part of processes executed by the program of CPU 31 or whole parts thereof.

Figure 21:
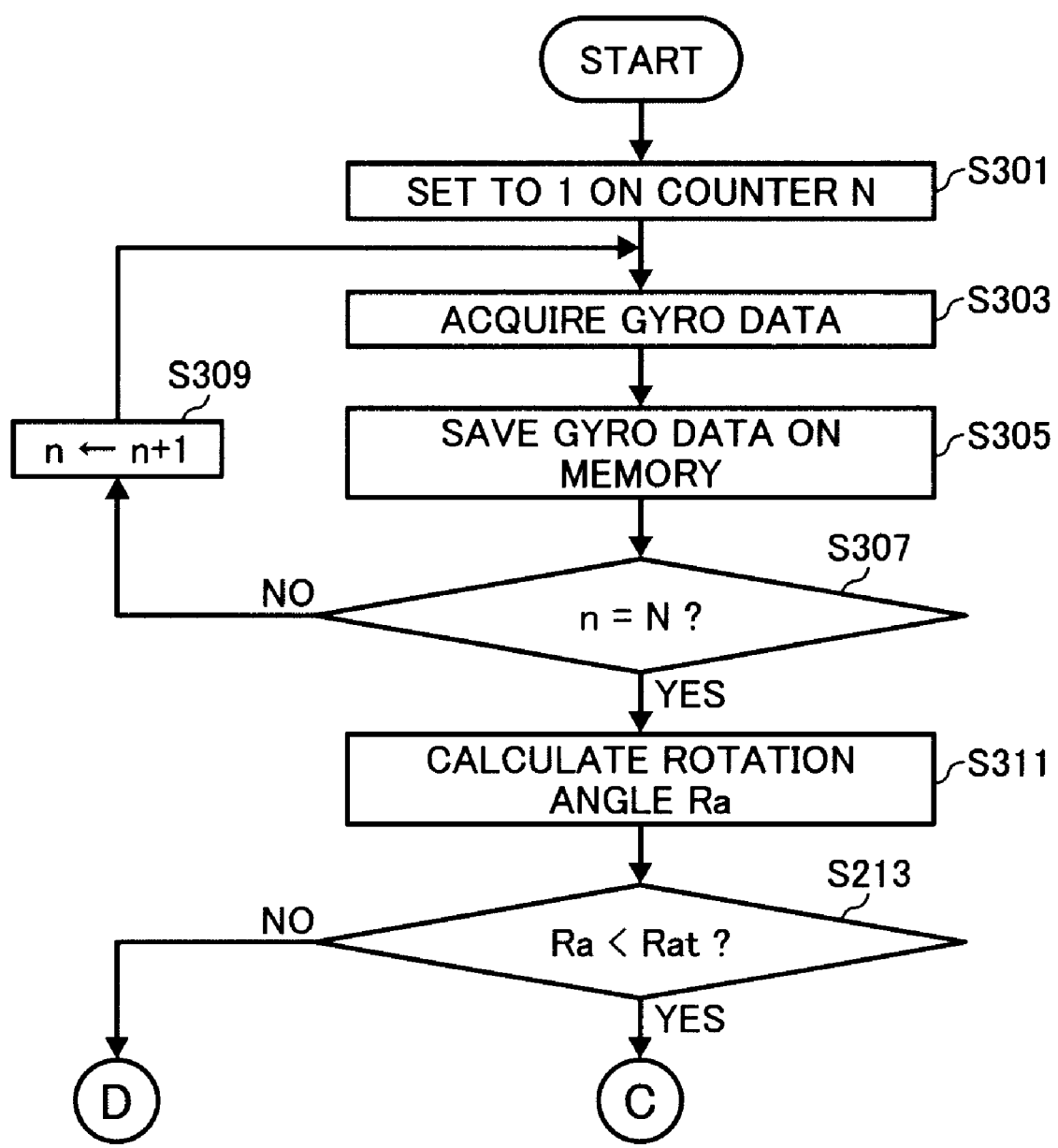
FIG. 21 is a flowchart showing processes to update correction data according to the second embodiment.
Figure 22:
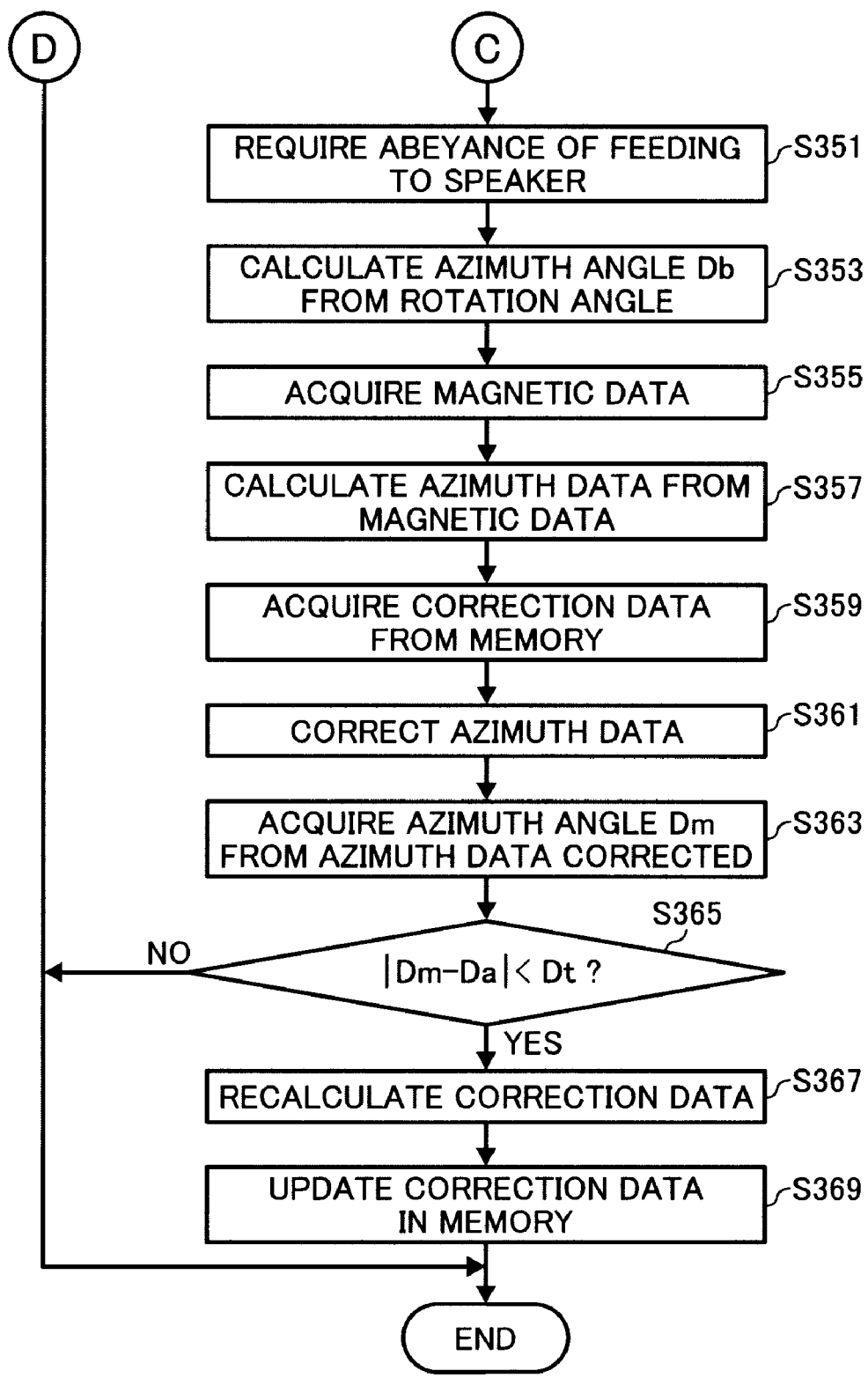
FIG. 22 is a flowchart showing processes to update correction data according to the second embodiment.

And in the second embodiment, the program corresponding to FIG. 21 and FIG. 22 is stored in ROM 33 as a recording medium.

The second correction data updating process operates a correction method according to the present invention.

As described above, the correction data is updated only in the case that the rotation angle acquired from the output signal of the gyro sensor 21 is less than the threshold value and the difference between the azimuth angle acquired from the output signal of the terrestrial magnetism sensor 11 and the azimuth angle acquired from the output signal of gyro sensor 21 is less than the threshold value in the sensor module 200, according to the second embodiment. Therefore, the second embodiment achieves the same benefits as in the first embodiment.

Further in the second embodiment, the sensor module can be miniaturized considerably because the terrestrial magnetism sensor 11 and each gyro sensor can be manufactured by the MEMS manufacturing process.

Figure 23:
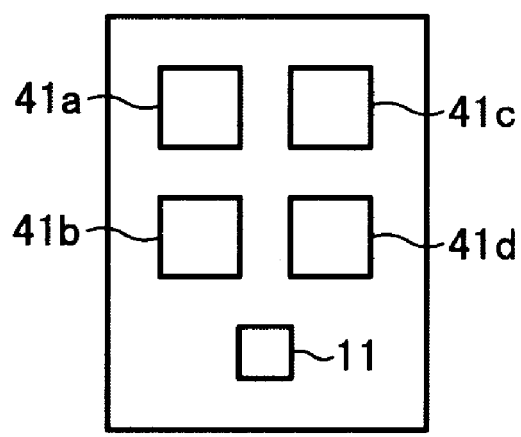
FIG. 23 shows unifying a terrestrial magnetism sensor and each gyro sensor in the second embodiment.

Further in the second embodiment, as shown in FIG. 23 as an example, the terrestrial magnetism sensor 11 and the each gyro sensor may be monolithic. Therefore, the sensor module can be miniaturized.

Figure 24:
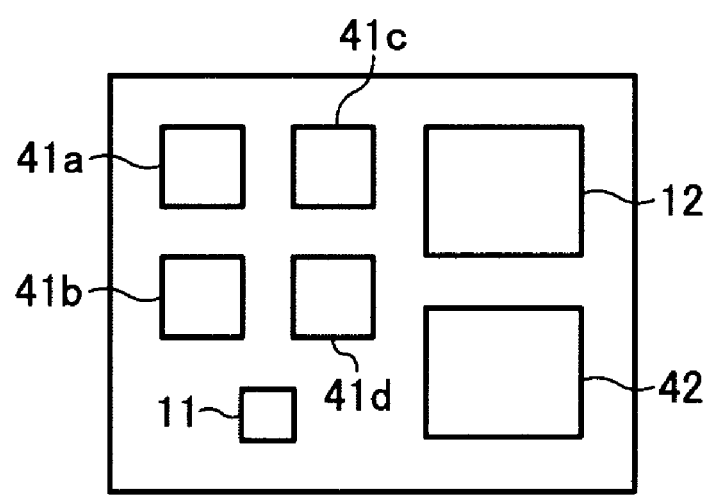
FIG. 24 shows unifying a terrestrial magnetism sensor, each acceleration sensor, and each signal processing circuit in the second embodiment.

Further in the first embodiment, as shown in FIG. 24 as an example, the terrestrial magnetism sensor 11, each gyro sensor, the signal processing circuit 12, and the processing circuit 42 may be monolithic. Therefore, the sensor module can be miniaturized as well. The monolithic configuration can also constrain the signals output from each sensor from being mixed with noise, and therefore the sensor module can increase accuracy of detection as well.

Further in the second embodiment, the CPU 31 can skip the step that judges whether updating correction data is adequate at the time or not in reference to the rotation angle acquired by a signal output from the gyro sensor 21, to decrease a process time.

Figure 25:
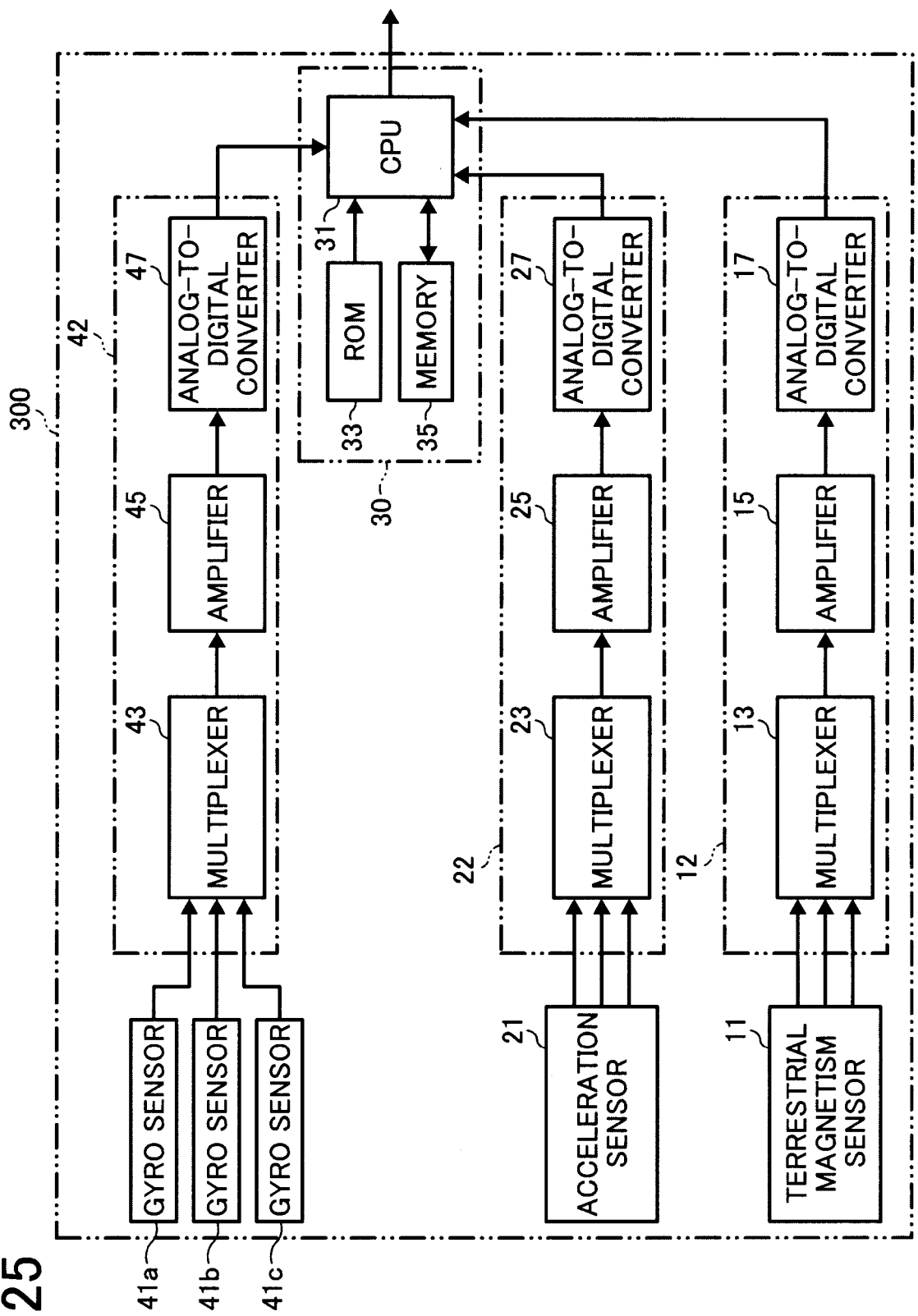
FIG. 25 a block diagram showing a configuration of a sensor module according to a third embodiment of the present invention.

A third embodiment of the present invention is described below with reference to FIG. 25 through FIG. 27. FIG. 25 schematically shows a configuration of a sensor module 300 according to the third embodiment of the present invention. The sensor module 300 includes the sensor module 100 of the first embodiment and three gyro sensors of the sensor module 200 in the second embodiment. And the sensor module 300 includes the signal processing circuit 42 acquiring the gyro data from output signals of each gyro sensor. The following discussion will mainly describe the third embodiment in terms of differences from the first embodiment and the second embodiment, using the same reference numerals as in the first and second embodiments for the same or equivalent parts as in the first and second embodiments, and description of the same parts may be omitted.

Next, an operation of the sensor module 300 as described above is described below with reference to the FIG. 26 and FIG. 27. Flow charts of FIG. 26 and FIG. 27 correspond to a processing algorithm carried out by the CPU 31. The memory 35 already stores the correction data.

The azimuth angle acquiring process operates the same as in the first embodiment.

Figure 26:
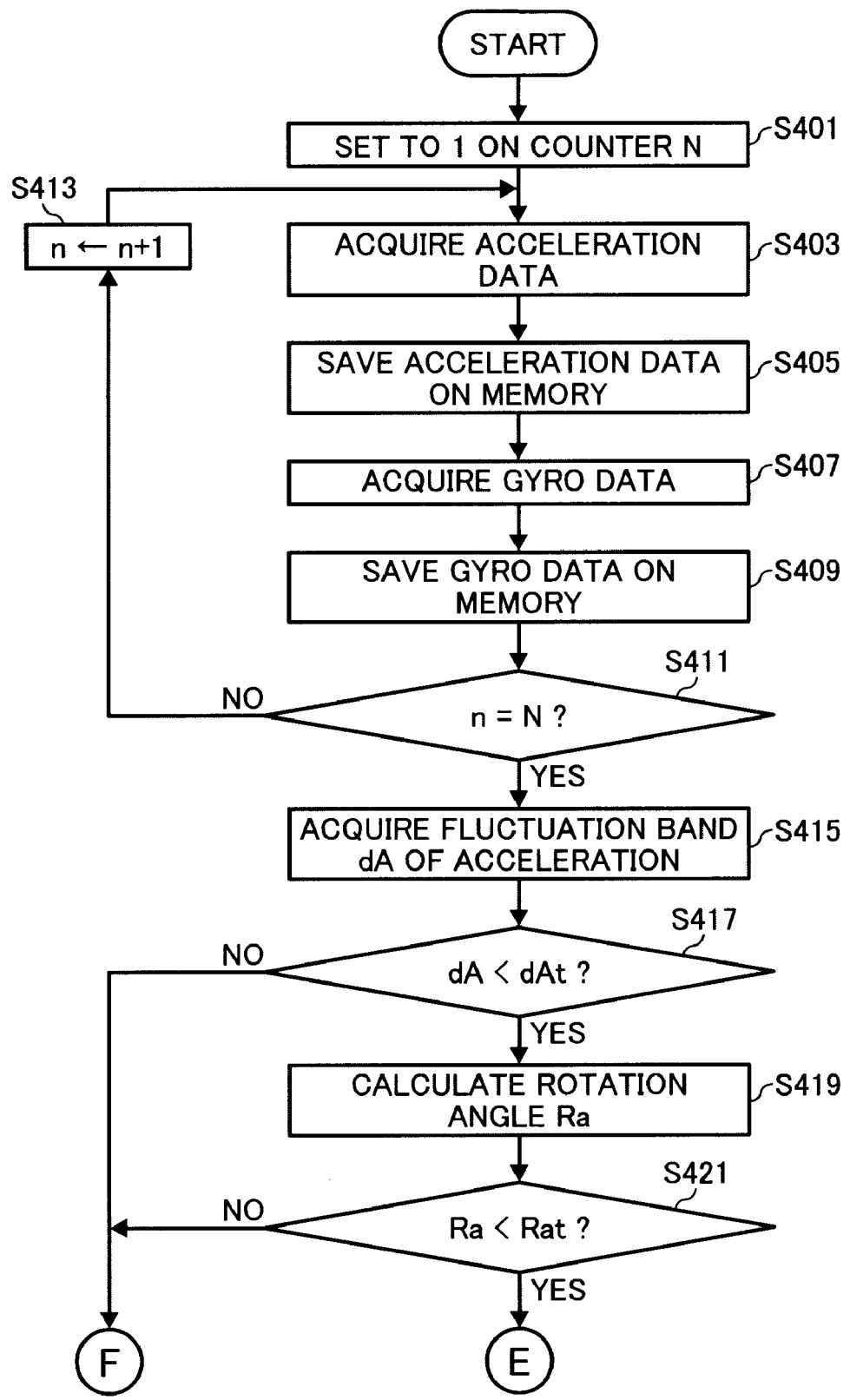
FIG. 26 is a flowchart showing processes to update correction data according to the third embodiment.
Figure 27:
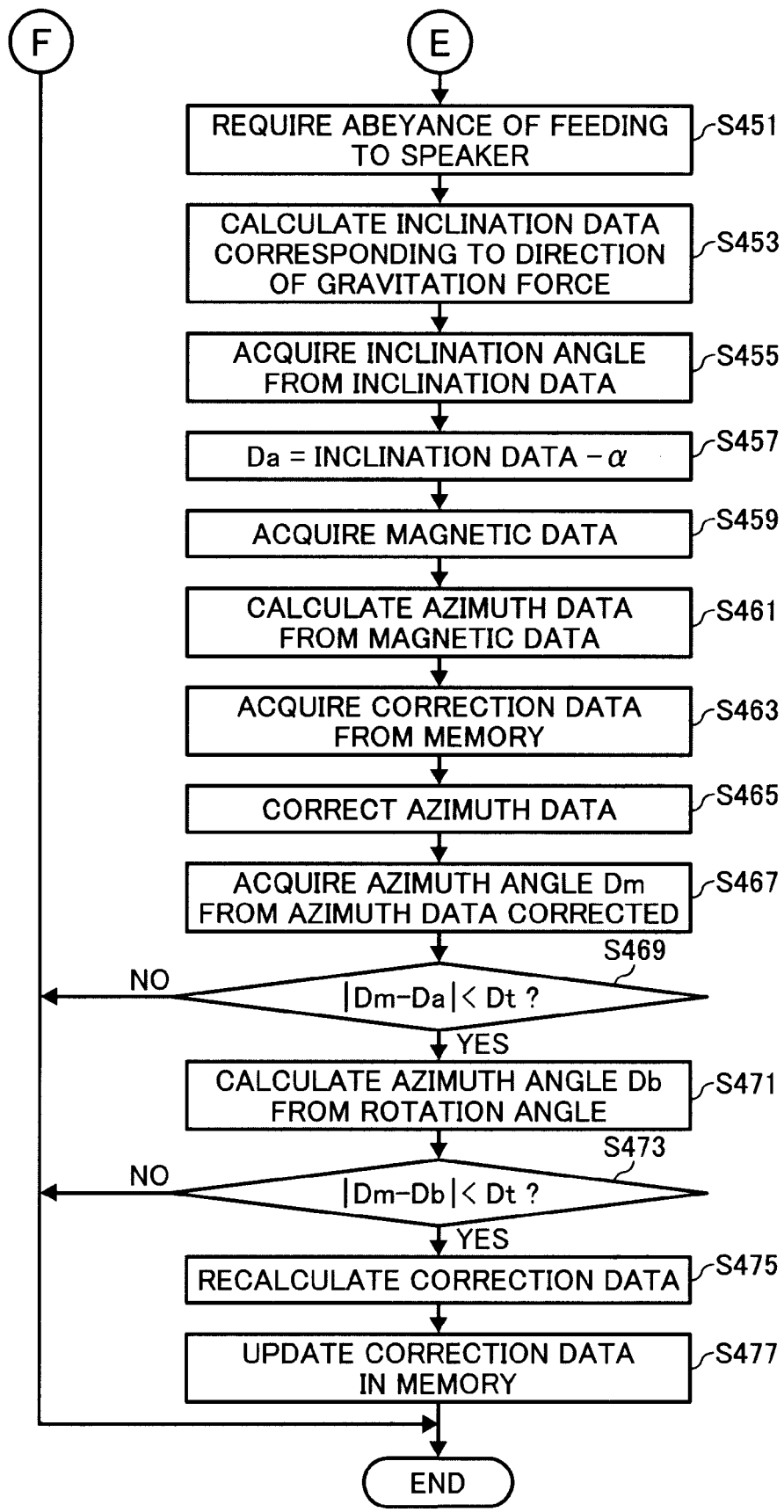
FIG. 27 is a flowchart showing processes to update correction data according to the third embodiment.

When updating of the correction data is requested by, for example, a timer interrupt, a start address of a program corresponding to FIG. 26 and FIG. 27 is set on program counter of the CPU 31 and a process (hereinafter called a third correction data updating process) starts.

In the first step S401, the CPU 31 sets a counter value to 1, and N acceleration readings are desired, as in the first and second embodiments.

In the next step S403, CPU 31 acquires acceleration data through the signal processing circuit 22.

In the next step S405, the CPU 31 saves the acquired acceleration data in the memory 35.

In the next step S407, CPU 31 acquires gyro data through the signal processing circuit 42.

In the next step S409, the CPU 31 saves the acquired gyro data in the memory 35.

In the next step S411, the CPU 31 judges whether a value in the counter is equal to the integer N or not. When the judgment indicates NO the first correction data updating process proceeds to a step S413 because the value in the counter is less than N.

In the step S413, the CPU 31 adds 1 to the value in the counter. The second correction data updating process returns to the step S403 after waiting for a predetermined time (for example 100 ms).

Then, the CPU 31 repeats steps S403 through S413 until the judgment in step S411 indicates YES.

When the value in the counter is equal to N, the judgment in step S411 indicates YES and the third correction data updating process proceeds to a step S415. At this time, N acceleration data acquired at different timings from each other have been saved in memory 35.

In the step S415, the CPU 31 reads the acceleration data saved in memory 35 and acquires a fluctuation band dA.

In the next step S417, the CPU 31 judges whether the fluctuation band dA is less than the threshold value dAt or not. The judgment indicates YES in the case that the fluctuation band dA is less than the threshold value dAt, and then the third correction data updating process proceeds to step S419.

In the step S419, the CPU 31 reads the gyro data saved in memory 35 and calculates a rotation angle Ra.

In the next step S421, the CPU 31 judges whether the rotation angle Ra is less than the threshold value Rat or not. The judgment indicates YES in the case that the rotation angle Ra is less than the threshold value Rat, and then the third correction data updating process proceeds to step S451.

The steps S451 through S467 are same as steps S251 through S267, and thus are not further described.

In the next step S469, the CPU 31 judges whether the difference between the azimuth angle Dm and Da is less than the threshold value Dt or not. The judgment indicates YES in the case that the difference between the azimuth angle Dm and Da is less than the threshold value Dt, and then the third correction data updating process proceeds to step S471.

In the step S471, the CPU 31 calculates the azimuth angle Db from the rotation angle Ra.

In the next step S473, the CPU 31 judges whether the difference between the azimuth angle Dm and the Db is less than the threshold value Dt or not. The judgment indicates YES in the case that the difference between the azimuth angle Dm and Db is less than the threshold value Dt, and then the second correction data updating process proceeds to step S475.

In the step S475, the CPU 31 recalculates correction data as in either of the first or second embodiments.

In the next step S477, the CPU 31 replaces the correction data saved in memory 35 with the recalculated correction data. In sum, the CPU 31 updates the correction data. Then, the third correction data updating process ends.

In addition, in the step S417, the judgment indicates NO in the case that the fluctuation band dA is not less than the threshold value dAt and the third correction data updating process ends. In that case, the CPU 31 does not update the correction data.

In addition, in the step S421, the judgment indicates NO in the case that the rotation angle Ra is not less than the threshold value Rat, and then the third correction data updating process ends. In that case, the CPU 31 does not update the correction data.

In addition, in the step S469, the judgment indicates NO in the case that the difference between the azimuth angle Dm and Da is not less than the threshold value Dt, and then the second correction data updating process ends. In that case, the CPU 31 does not update the correction data.

In addition, in the step S469, the judgment indicates NO in the case that the difference between the azimuth angle Dm and Db is not less than the threshold value Dt, and then the second correction data updating process ends. In that case, the CPU 31 does not update the correction data.

As evident from the description above, the processing device includes the signal processing circuit 12, the signal processing circuit 22, the signal processing circuit 42, and the arithmetic device 30 in the sensor module 300 according to the third embodiment of the present invention. Hardware may execute at least a part of processes executed by the program of CPU 31 or whole parts thereof.

In the third embodiment, the programs corresponding to FIG. 26 and FIG. 27 are stored in ROM 33 as a recording medium.

The third correction data updating process operates a correction method according to the present invention.

As described above, the correction data is updated only in the case that the fluctuation band of acceleration acquired from output signals of the acceleration sensor 21 and the rotation angle acquired from the output signals of the gyro sensor 21 are less than the threshold value and the difference between the azimuth angle acquired from the output signals of the terrestrial magnetism sensor 11 and the inclination angle acquired from the output signals of the acceleration sensor 21 are less than the threshold value in the sensor module 300, according to the third embodiment. Therefore, the third embodiment achieves the same benefits as in the first embodiment.

Further in the third embodiment, the sensor module can be miniaturized considerably because the terrestrial magnetism sensor 11, the acceleration sensor 21, and each gyro sensor can be manufactured by the MEMS manufacturing process.

Figure 28:
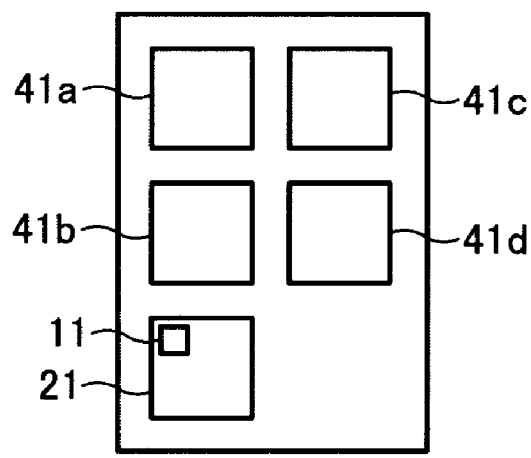
FIG. 28 is a drawing showing unifying each sensor in the third embodiment.

Further in the third embodiment, as shown in FIG. 28 as an example, the terrestrial magnetism sensor 11, the acceleration sensor 21, and each gyro sensor may be monolithic. Therefore, the sensor module can be miniaturized.

Figure 29:
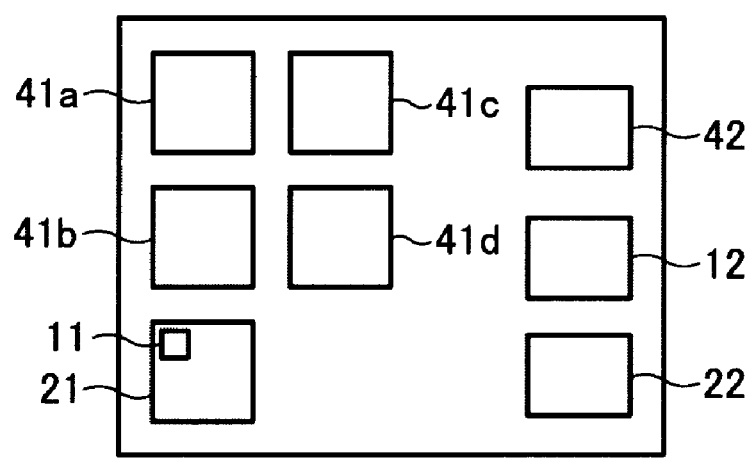
FIG. 29 is a drawing showing unifying each sensor and each signal processing circuit in the third embodiment.

Further in the third embodiment, as shown in FIG. 29 as an example, the terrestrial magnetism sensor 11, the acceleration sensor 21, each gyro sensor, the signal processing circuit 12, the signal processing circuit 22, and the processing circuit 42 may be monolithic. Therefore, the sensor module can be miniaturized as well. The monolithic configuration can also constrain the signals output from each sensor from being mixed with noise, and therefore the sensor module can increase accuracy of detection as well.

Further in the third embodiment, the third correction data updating process judges whether updating correction data is adequate at a time or not in reference to the fluctuation band dA of acceleration. However, the third correction data updating process may judge whether updating correction data is adequate at the time or not in reference to a changing trend of the azimuth data according to a changing trend of magnetic field and a changing trend of the inclination data according to a changing trend of a rotation angle.

Further, the first correction data updating process may judge whether updating correction data is adequate at the time or not in reference to a parallelism of a magnetic field at a position of the mobile object as well.

Further in the third embodiment, the CPU 31 can skip the step that judges whether updating correction data is adequate at the time or not in reference to the fluctuation band and the rotation angle acquired by a signal output from the gyro sensor 21, to reduce a process time.

Figure 30A:
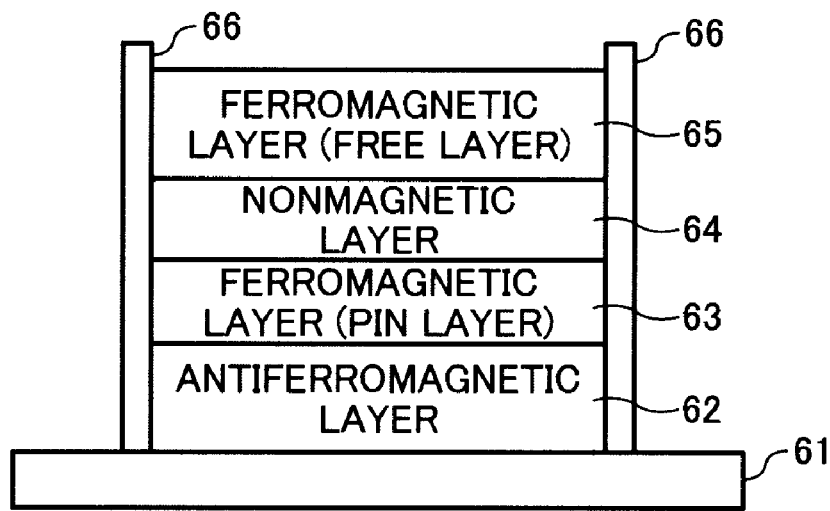
FIGS. 30A and 30B are side views of TMR element mounted on the terrestrial magnetism sensor in the third embodiment.
Figure 30B:
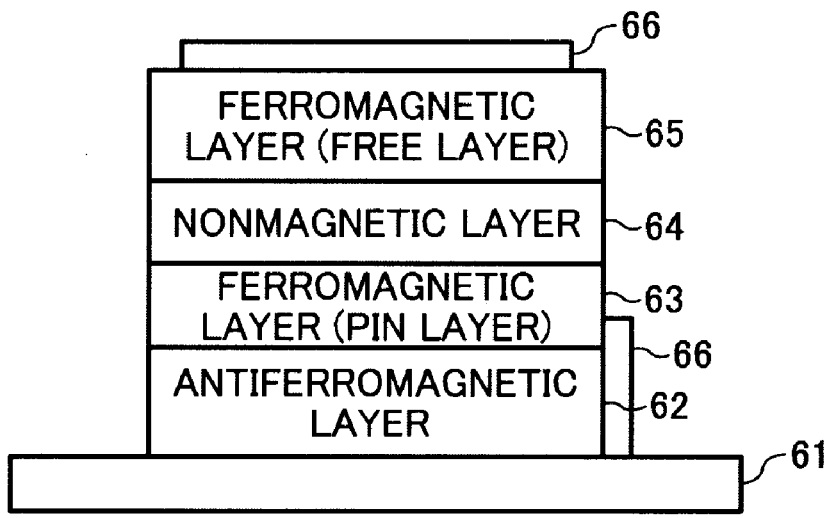

Further, the magnetic resistance effect element is a TMR element according to the above embodiments of the prevent invention. However, the present invention is not limited to such a feature and may instead use a giant magnetic resistance effect element (GMR element). In that case, the present invention may use a CIP (Current In Plane) type GMR element, as shown in FIG. 30A as an example, or a CPP (Current Perpendicular Plane) type GMR element, as shown in FIG. 30B as an example. An antimagnetic layer 62, a ferromagnetic layer (pin layer) 63, a nonmagnetic layer 64, and a ferromagnetic layer (free layer) 65 stacked on a substrate 61 in sequence form the GMR element. Element 66 of FIGS. 30A and 30B indicates an electrode.

The terrestrial magnetism sensor includes four magnetic field detecting axes that have different directions of magnetic field detecting axes from each other according to the embodiments of the prevent invention, but the present invention is not limited to that feature, and the terrestrial magnetism sensor may include at least two magnetic field detecting axes.

The acceleration sensor is based on a piezo electrode according to the first and third embodiments of the prevent invention, but the present invention is not limited to that feature and the acceleration sensor may be based on a capacitance model.

The acceleration sensor outputs the first acceleration signal, the second acceleration signal, and the third acceleration signal according to the first and third embodiments of the prevent invention, but the present invention is not limited to that feature and the acceleration sensor may output the first acceleration signal and one of the second or third acceleration signals.

The first and third embodiments use the inclination angle to the gravity direction acquired from output signal of the acceleration sensor according to the prevent invention, but the present invention is not limited to that feature and may instead use the rotation angle acquired from the output signal from the acceleration sensor. In that case, for example, the CPU 31 calculates the rotation data based on acceleration information including the output signal of the acceleration sensor, executes a process acquiring the azimuth angle to the reference direction (for example north) as a substitute for the steps S253 through S257 and, in the step S269, the CPU 31 judges whether the difference between the azimuth angle above and the azimuth angle acquired from the output signal from terrestrial magnetism sensor 11 is less than the threshold value Dt or not.

The gyro sensor is a piezoelectric gyro sensor according to the second and third embodiments of the prevent invention, but the present invention is not limited to that feature and the gyro sensor may be a rotation type gyro sensor or a fiber optics type gyro sensor.

The sensor module includes three gyro sensors according to second and third embodiments of the prevent invention, but the present invention is not limited to the that feature and the sensor module may include two gyro sensors. All the present invention needs is the angular information regarding two axis directions, one axis direction being different from the other axis direction.

Each threshold value dAt, Dt, dMt and Rat is not limited to the specific embodiments.

The programs according to the present invention are stored in ROM 33 according to the embodiments of the present invention, but the present invention is not limited to that feature, and the program may be recorded on other recording mediums (CD, optical magnetic disc, DVD, memory card, USB memory, flash memory, and so on). In the case that the program is recorded on a flash memory, the program is loaded on a flash memory through a producing device corresponding to each recording medium (or a dedicated interface). The program may be transferred to the flash memory through a network (LAN, intranet, internet, and so on).

The reference direction is north according to embodiments of the prevent invention, but the present invention is not limited to that feature.

The each sensor, the each signal processing circuit, and the arithmetic device 30 may also be formed on one substrate.

The sensor module may also include a general magnetic sensor as a substitute for the terrestrial magnetism sensor in the case of detecting the magnetic field other than terrestrial magnetism.

Obviously, numerous additional modifications and variations of the present invention are possible in light of the above teachings. It is therefore to be understood that within the scope of the appended claims, the present invention may be practiced otherwise than as specifically described herein.

The present application claims priority to JP 2006-274614 filed on Oct. 6, 2006, the entire contents of which are hereby incorporated herein by reference.

What is claimed is:

1. A sensor module mounted on a mobile object, comprising:
   a magnetic sensor having at least two magnetic field detecting axes and that outputs first azimuth data indicating a first direction that a reference portion in the mobile object faces based on magnetic information;
   a motion sensor detecting at least one of an acceleration motion or angular motion of the mobile object and configured to output a second azimuth data indicating a second direction that the reference portion in the mobile object faces based on the acceleration motion or angular motion; and
   a processing device that stores correction data to correct the magnetic information used by the magnetic sensor, and that updates that stored correction data when a difference between the first azimuth data and the second azimuth data is less than a first threshold value.

2. The sensor module according to claim 1, wherein:
   the magnetic sensor is a terrestrial magnetism sensor.

3. The sensor module according to claim 2, wherein:
   the motion sensor is one of an acceleration sensor or a gyro sensor.

4. The sensor module according to claim 3, wherein:
   the motion sensor includes the acceleration sensor; and
   the second azimuth data is an inclination data to a direction of gravity calculated from an output signal from the acceleration sensor.

5. The sensor module according to claim 3, wherein:
   the motion sensor includes a gyro sensor; and
   the second azimuth data is calculated from an output signal from the gyro sensor.

6. The sensor module according to claim 4, wherein:
   the processing device acquires acceleration information from the acceleration sensor prior to judging whether the difference is less than the first threshold value or not; and
   the processing device judges whether the difference is less than the first threshold value or not in a case that a fluctuation band of accelerations is less than a second threshold value.

7. The sensor module according to claim 1, wherein:
   the processing device acquires the magnetic information from the magnetic sensor and rotation information from at least the motion sensor prior to judging whether the difference is less than the first threshold value or not; and
   the processing device judges whether the difference is less than the first threshold value or not when changing trends of a magnetic field and a rotation angle are the same as each other.

8. The sensor module according to claim 1, wherein:
   the processing device acquires the magnetic information from the magnetic sensor and rotation information from at least the motion sensor prior to judging whether the difference is less than the first threshold value or not;
   the processing device calculates a declination angle from a parallel direction of a magnetic field at a position of the mobile object based on the magnetic information and rotation information; and
   the processing device judges whether the difference is less than the first threshold value or not when a declination angle is less than the third threshold value.

9. The sensor module according to claim 7, wherein:
   the magnetic sensor and the motion sensor are monolithic.

10. The sensor module according to claim 8, wherein:
    the magnetic sensor and the motion sensor are monolithic.

11. The sensor module according to claim 7, wherein:
the magnetic sensor and the motion sensor are manufactured on a same substrate by an Micro Electro Mechanical System (MEMS) manufacturing process.

12. The sensor module according to claim 8, wherein:
the magnetic sensor and the motion sensor are manufactured on a same substrate by an Micro Electro Mechanical System (MEMS) manufacturing process.

13. The sensor module according to claim 9, wherein:
the magnetic sensor includes a tunneling magnetic resistance effect element or a giant magnetic resistance effect element.

14. The sensor module according to claim 10, wherein:
the magnetic sensor includes a tunneling magnetic resistance effect element or a giant magnetic resistance effect element.

15. The sensor module according to claim 11, wherein:
the magnetic sensor includes a tunneling magnetic resistance effect element or a giant magnetic resistance effect element.

16. The sensor module according to claim 12, wherein:
the magnetic sensor includes a tunneling magnetic resistance effect element or a giant magnetic resistance effect element.

17. A correction method for correcting magnetic information for a sensor module mounted on a mobile object including a magnetic sensor including at least two magnetic field detecting axes and a motion sensor detecting at least one of an acceleration or angular motion of the mobile object, the method comprising:
calculating a first azimuth data indicating a direction that a reference portion of the mobile object faces based on magnetic information from the magnetic sensor;
calculating a second azimuth data indicating a direction that the reference portion of the mobile object faces based on information from at least the motion sensor;
judging whether a difference between the first azimuth data and the second azimuth data is less than a first threshold value or not;
updating a stored correction data for correcting magnetic data in a case the difference is less than the first threshold value; and
correcting the magnetic information based on the correction data.

18. The correction method according to claim 17, further comprising:
acquiring acceleration information from the acceleration sensor prior to judging whether the difference is less than the first threshold value or not;
obtaining a fluctuation band of accelerations based on the acceleration information; and
judging whether the difference is less than the first threshold value or not when the fluctuation band of accelerations is less than a second threshold value.

19. The correction method according to claim 17, further comprising:
acquiring the magnetic information from the magnetic sensor and rotation information from at least the motion sensor prior to judging whether the difference is less than the first threshold value or not; and
obtaining a first changing trend of magnetic field from the magnetic information;
obtaining a second changing trend of a rotation angle from the rotation information; and
judging whether the difference is less than the first threshold value or not when changing trends of magnetic field and a rotation angle are the same as each other.

20. A mobile object comprising:
a sensor module according to claim 1.

* * * * *